US010034010B2

(12) United States Patent
Hendry et al.

(10) Patent No.: US 10,034,010 B2
(45) Date of Patent: Jul. 24, 2018

(54) ALIGNMENT OF OPERATION POINT SAMPLE GROUP IN MULTI-LAYER BITSTREAMS FILE FORMAT

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/293,092

(22) Filed: Oct. 13, 2016

(65) Prior Publication Data
US 2017/0111650 A1    Apr. 20, 2017

Related U.S. Application Data

(60) Provisional application No. 62/241,691, filed on Oct. 14, 2015.

(51) Int. Cl.
*H04N 19/463* (2014.01)
*H04N 19/593* (2014.01)
*H04N 19/187* (2014.01)

(52) U.S. Cl.
CPC ......... *H04N 19/463* (2014.11); *H04N 19/187* (2014.11); *H04N 19/593* (2014.11)

(58) Field of Classification Search
CPC ... H04N 19/463; H04N 19/187; H04N 19/593
See application file for complete search history.

(56) References Cited

U.S. PATENT DOCUMENTS 8,719,309 B2 * 5/2014 Singer .............. H04N 21/21805
707/802
2013/0097334 A1 * 4/2013 Wu ....................... H04L 65/608
709/231

(Continued)

FOREIGN PATENT DOCUMENTS

AU    2012203922 A1    7/2012
GB       2469563 A   10/2010
WO    2015059194 A1   4/2015

OTHER PUBLICATIONS

Feuvre J.L., et al., "Support for Efficient Tile Access in the HEVC File Format", 104. MPEG Meeting; Apr. 22, 2013-Apr. 26, 2013; Incheon; (Motion Picture Expert Group or ISO/IEC JTC1 /SC29/ WG11), No. M29231 , Apr. 17, 2013 (Apr. 17, 2013), XP030057763, 11 pages.

(Continued)

*Primary Examiner* — Joseph Suh
(74) *Attorney, Agent, or Firm* — Shumaker & Sieffert, P.A.

(57) ABSTRACT

An apparatus obtains an operation point reference track in the file and one or more additional tracks in the file. No operation point information sample group is signaled in any of the additional tracks. For each respective sample of each respective additional track of the one or more additional tracks, the apparatus determines whether to consider the respective sample part of the operation point information sample group. Based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

32 Claims, 12 Drawing Sheets

(56) References Cited

U.S. PATENT DOCUMENTS

| | | | |
|---|---|---|---|
| 2014/0023138 A1* | 1/2014 | Chen | H04N 19/597 375/240.12 |
| 2015/0016532 A1 | 1/2015 | Chen et al. | |
| 2015/0110473 A1* | 4/2015 | Wang | H04N 19/136 386/341 |
| 2016/0057444 A1* | 2/2016 | Gisquet | H04N 19/52 375/240.12 |
| 2016/0119639 A1* | 4/2016 | Sato | H04N 19/52 382/238 |
| 2016/0182927 A1* | 6/2016 | Denoual | H04N 21/234345 725/109 |

OTHER PUBLICATIONS

International Search Report and Written Opinion—PCT/US2016/057109—ISA/EPO—Dec. 9, 2016.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Information technology—Coding of audio-visual objects—Part 15: Carriage of network abstraction layer (NAL) unit structured video in the ISO base media file format, ISO/IEC FDIS 14496-15-2014; Jan. 13, 2014, 181 pp.

Boyce, et al., "Draft high efficiency video coding (HEVC) version 2, combined format range extensions (RExt), scalability (SHVC), and multi-view (MV-HEVC) extensions," Jun. 30-Jul. 9, 2014; (Joint Collaborative Team on Video Coding (JCT-VC) of ITU-T SG 16 WP 3 and ISO/IEC JTC 1/SC 29/WG 11) document No. JCTVC-R1013_v6; Oct. 1, 2014; 545 pp.

"International Standard ISO/IEC 14496-12, Information Technology—Coding of audio-visual objects—Part 12: ISO base media file format," Third Edition, Oct. 15, 2008, 120 pp.

3GPP TS 26.244 V9.1.0, 3rd Generation Partnership Project; Technical Specification Group Services and System Aspects; Transparent end-to-end packet switched streaming service (PSS); 3GPP file format (3GP), (Release 12), Dec. 2013, 61 pp.

"International Standard ISO/IEC 14496-15, Information Technology—Coding of audio-visual objects—Part 15: Carriage of network abstraction layer (NAL) unit structured video in ISO base media file format," Third Edition, Jul. 1, 2014, 124 pp.

* cited by examiner

ALIGNMENT OF OPERATION POINT SAMPLE GROUP IN MULTI-LAYER BITSTREAMS FILE FORMAT

This application claims the benefit of U.S. Provisional Patent Application 62/241,691, filed Oct. 14, 2015, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, this disclosure relates to storage of video contents in ISO based media file formats and file formats derived based on it. More specifically, this disclosure describes techniques for defining operation point sample group when samples of tracks within a file are not aligned. Note that the terms "operation point" and "operating point" are used interchangeably in this document.

In one example, this disclosure describes a method of processing a file, the method comprising: obtaining an operation point reference track in the file, wherein an operation point available for a bitstream in the file is described in the file using an operation point information sample group that is signaled in the operation point reference track; obtaining one or more additional tracks in the file, wherein no operation point information sample group is signaled in any of the additional tracks; for each respective sample of each respective additional track of the one or more additional tracks, determining whether to consider the respective sample part of the operation point information sample group, wherein: based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and performing a sub-bitstream extraction process that extracts the operation point from the bitstream.

In another example, this disclosure describes a method of generating a file, the method comprising: generating an operation point reference track in the file, wherein generating the operation point reference track comprises signaling, in the operation point reference track, an operation point information sample group that describes an operation point available for a bitstream in the file; and generating one or more additional tracks in the file, wherein: no operation point information sample group is signaled in any of the additional tracks, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

In another example, this disclosure describes an apparatus for processing a file, the apparatus comprising: a memory configured to store the file; and one or more processors coupled to the memory, the one or more processors configured to: obtain an operation point reference track in the file, wherein an operation point available for a bitstream in the file is described in the file using an operation point information sample group that is signaled in the operation point reference track; obtain one or more additional tracks in the file, wherein no operation point information sample group is signaled in any of the additional tracks; for each respective sample of each respective additional track of the one or more additional tracks, determine whether to consider the respective sample part of the operation point information sample group, wherein: based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and perform a sub-bitstream extraction process that extracts the operation point from the bitstream.

In another example, this disclosure describes an apparatus for generating a file, the apparatus comprising: a memory configured to store the file; and one or more processors coupled to the memory, the one or more processors configured to: generate an operation point reference track in the file, wherein generating the operation point reference track comprises signaling, in the operation point reference track, an operation point information sample group that describes an operation point available for a bitstream in the file; and generate one or more additional tracks in the file, wherein: no operation point information sample group is signaled in any of the additional tracks, the operation point information sample group, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

In another example, this disclosure describes an apparatus for processing a file, the apparatus comprising: means for obtaining an operation point reference track in the file, wherein an operation point available for a bitstream in the file is described in the file using an operation point information sample group that is signaled in the operation point reference track; means for obtaining one or more additional tracks in the file, wherein no operation point information sample group is signaled in any of the additional tracks; means for determining, for each respective sample of each respective additional track of the one or more additional tracks, whether to consider the respective sample part of the operation point information sample group, wherein: based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and means for performing a sub-bitstream extraction process that extracts the operation point.

In another example, this disclosure describes an apparatus for generating a file, the apparatus comprising: means for generating an operation point reference track in the file, wherein generating the operation point reference track comprises signaling, in the operation point reference track, an operation point information sample group that describes an operation point available for a bitstream in the file; and means for generating one or more additional tracks in the file, wherein: no operation point information sample group is signaled in any of the additional tracks, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

In another example, this disclosure describes a computer-readable storage medium storing instructions that, when executed, cause one or more processors to: obtain an operation point reference track in the file, wherein an operation point available for a bitstream in the file is described in the file using an operation point information sample group that is signaled in the operation point reference track; obtain one or more additional tracks in the file, wherein no operation point information sample group is signaled in any of the additional tracks; for each respective sample of each respective additional track of the one or more additional tracks, determine whether to consider the respective sample part of the operation point information sample group, wherein: based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and perform a sub-bitstream extraction process that extracts the operation point from the bitstream.

In another example, this disclosure describes a computer-readable storage medium storing instructions that, when executed, cause one or more processors to: generate an operation point reference track in the file, wherein generating the operation point reference track comprises signaling, in the operation point reference track, an operation point information sample group that describes an operation point available for a bitstream in the file; and generate one or more additional tracks in the file, wherein: no operation point information sample group is signaled in any of the additional tracks, the operation point information sample group, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

The details of one or more examples of the disclosure are set forth in the accompanying drawings and the description below. Other features, objects, and advantages will be apparent from the description, drawings, and claims.

DETAILED DESCRIPTION

Figure 1:
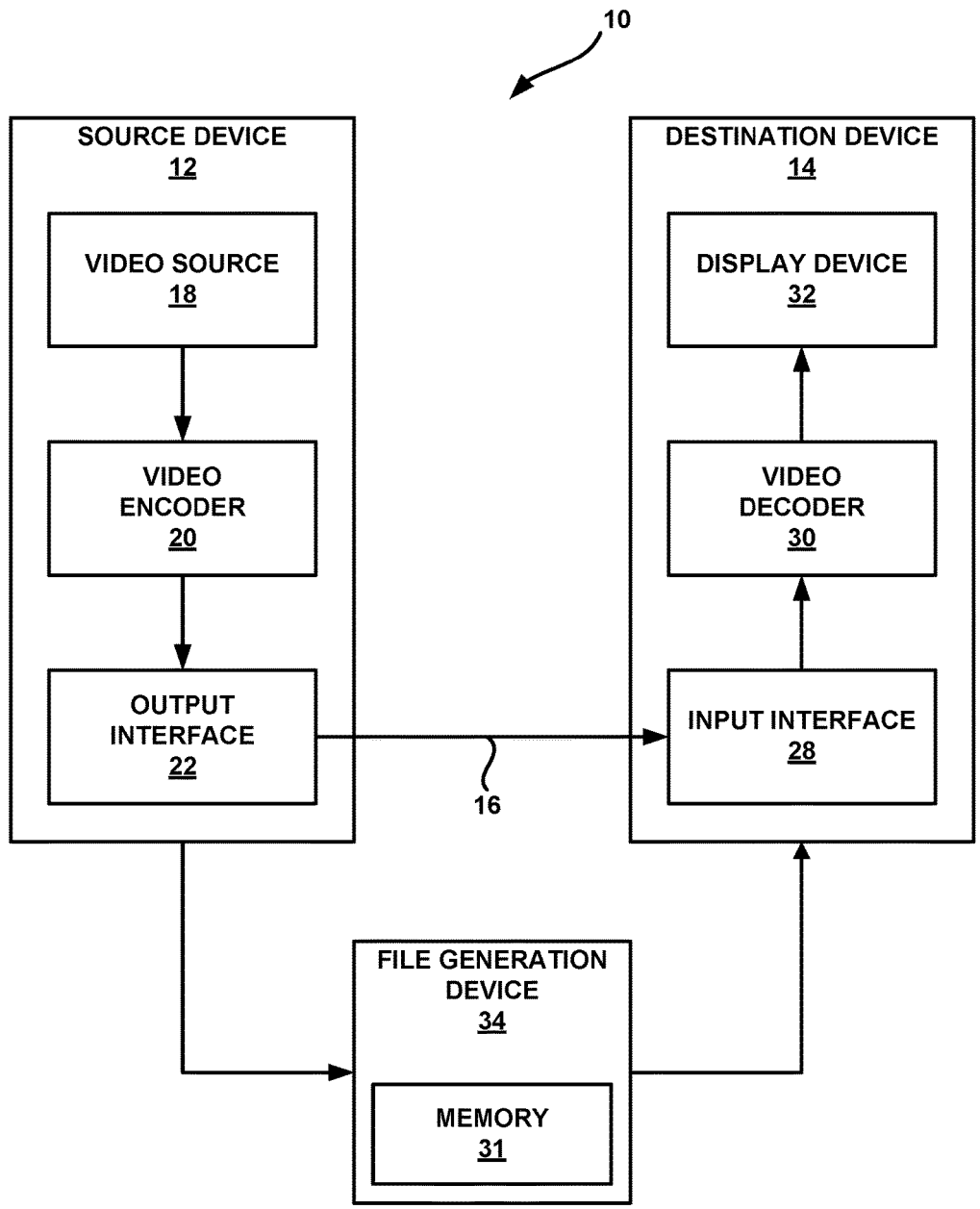
FIG. 1 is a block diagram illustrating an example video coding system that may utilize the techniques described in this disclosure.

In general, this disclosure relates to techniques for generating and processing files for storing multi-layer bitstreams of encoded video data, such as Layered High Efficiency Video Coding (L-HEVC) bitstreams. A multi-layer bitstream comprises multiple layers. Each layer comprises a sequence of encoded pictures occurring at different output times. In the case of scalable video coding, the layers of a multi-layer bitstream may include a base layer and one or more enhancement layers. The base layer is decodable without reference to any of the enhancement layers. The enhancement layers may spatially or temporal enhance the pictures of the base layer. For instance, an enhancement layer may have a higher frame rate than the base layer. Thus, an enhancement layer may include an encoded picture for an output time and the base layer does not include an encoded picture for that output time. In the case where a first layer of a multi-layer bitstream includes an encoded picture at an output time and a second layer of the multi-layer bitstream does not include an encoded picture for the output time, the encoded picture in the first layer is said to be unaligned with an encoded picture in the second layer. In multi-view video coding, the layers of a multi-layer bitstream may correspond to encoded pictures in different views.

An operation point of a multi-layer bitstream may be defined by a set of one or more layers in the multi-layer bitstream and a maximum temporal identifier. For instance, a particular operation point may be defined as a particular subset of the full set of layers in a multi-layer bitstream and a maximum temporal identifier that is less than or equal to a maximum temporal identifier in the multi-layer bitstream. Encoded pictures in an operation point of a multi-layer bitstream may be decoded without decoding encoded pictures of the multi-layer bitstream not in the operation point.

Operation points are useful for a variety of reasons. For example, a device may choose to forward to a client device a particular operation point of a multi-layer bitstream while not forwarding parts of the multi-layer bitstream not in the operation point. As a result, the amount of data forwarded may be reduced. This may be desirable in bandwidth constrained environments. Furthermore, different operation points of the same multi-layer bitstream may require different decoder capabilities to be performed. Thus, if a decoder is capable of decoding a first operation point of a multi-layer bitstream, but not a second operation point of the same multi-layer bitstream, it may be wasteful to send data of the multi-layer bitstream in the second operation point that are not in the first operation point.

The International Standards Organization (ISO) base media file format is a file format for storage of media data, such as audio and video data. The ISO base media file format has been extended for particular scenarios. For instance, efforts are underway to extend the ISO base media file format for storage of L-HEVC bitstreams. In the ISO base media file format media data may be organized into one or more tracks. Furthermore, in the ISO base media file format and extensions thereof, the term "sample" applies to a media access unit, such as a video access unit or an audio access unit. However, at the codec level, the term "sample" may apply to a value of a color component of a pixel. A video access unit may include one or more encoded pictures having the same output time. Different tracks may include samples comprising encoded pictures of different layers of a multi-layer bitstream. In some instances, a track may include samples comprising encoded pictures of two or more layers of the multi-layer bitstream. In other instances, a track may include samples that only include coded pictures of a single layer of the multi-layer bitstream.

The ISO base media file format provides a mechanism for grouping samples into "sample groups." For instance, the ISO base media file format is structured in terms of data structures referred to as "boxes," which may be nested inside one another. The boxes of a file may include track boxes for tracks of the file. A track box for a track includes metadata regarding the track. For instance, a track box may include a sample description box that includes a set of sample group description entries, each of which includes a description of a sample group. Additionally, a track box for a track may include a sample-to-group box that indicates a set of samples in the track and specifies an index of a sample group description entry in the sample group description entry box, thereby specifying a sample group to which the indicated samples belong.

A draft of the extension of the ISO base media file format for L-HEVC provides for an operation point information sample group. Samples belonging to an operation point information sample group include samples that comprise encoded pictures of an operation point. A sample group description entry for the operation point information sample group may specify information for the operation point, such as any combination of an output layer set of the operation point, a maximum temporal identifier of the operation point, and profile, tier, and level information for the operation point. Specifying an operation point information sample group in a file may enable a device to extract an operation point from the file without needing to interpret the underlying encoded video data, such as L-HEVC data. As such, the foregoing may simplify the device and increase responsiveness.

The draft of the extension of the ISO base media file format for L-HEVC specifies that sample-to-group boxes and the sample group description boxes in a file are contained in the metadata for only one track of the file (i.e., the operation point reference track). As noted above, a sample-to-group box in a track box for a track specifies samples in the track. However, as also noted above, layers of a multilayer bitstream may be included in different tracks and layers may include non-aligned encoded pictures. Thus, a sample-to-group box in the track box for the operation point reference track may not be able to indicate that particular samples of additional tracks are in an operation point information sample group. For instance, when the operation point reference track includes samples at output times 1, 3, and 5, and an additional track includes samples at output times 1, 2, 3, 4, 5, and 6, the sample-to-group box may not be able to specify that the sample of the additional track at output time 6 is part of an operation point sample group, despite the encoded pictures in the sample of the additional track at output time 6 properly being part of an operation point to which the operation point sample group corresponds. As a result, a device might be able to extract the operation point from the file properly. In this disclosure, a track may be said to contain a sample group when the track includes samples belonging to the sample group.

This disclosure describes various techniques addressing this problem. For example, for each respective sample of each respective additional track of the one or more additional tracks, a device may determine whether to consider the respective sample part of the operation point information sample group. In this example, based on the operation point reference track containing a sample that is temporally collocated with the respective sample in the respective additional track, the respective sample in the respective additional track is considered part of the operation point information sample group. Furthermore, in this example, based on the operation point reference track not containing a sample that is temporally collocated with the respective sample in the respective additional track, the respective sample in the respective additional track is considered part of an operation point information sample group of the last sample in the operation point reference track before the respective sample of the respective additional track. Thus, in the example of the previous paragraph, the sample of the additional track at output time 6 would be considered part of the operation point sample group.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. This disclosure may use the term "video processing device" to refer to a device that processes video data. Source device 12 and destination device 14 are examples of video processing devices. Other types of video processing devices include devices that multiplex and demultiplex media data, such as MPEG-2 data streams.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. The file server may stream encoded video data stored in a file generated in accordance with the techniques of this disclosure.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Furthermore, in the example of FIG. 1, video coding system 10 includes a file generation device 34. File generation device 34 may receive encoded video data generated by source device 12. File generation device 34 may generate a file that includes the encoded video data. Destination device 14 may receive the file generated by file generation device 34. In various examples, source device 12 and/or file generation device 34 may include various types of computing devices. For instance, source device 12 and/or file generation device 34 may comprise a video encoding device, a Media Aware Network Element (MANE), a server computing device, a personal computing device, a special-purpose computing device, a commercial computing device, or another type of computing device. In some examples, file generation device 34 is part of a content delivery network. Source device 12 and/or file generation device 34 may receive the encoded video data from source device 12 via a channel such as link 16. Furthermore, destination device 14 may receive the file from file generation device 34 via a channel such as link 16. File generation device 34 may be considered a video device. As shown in the example of FIG. 1, file generation device 34 may comprise a memory 31 configured to store a file that contains encoded video contents.

In some examples, source device 12 or another computing device may generate a file that includes the encoded video data. For ease of explanation, this disclosure may describe source device 12 or file generation device 34 as generating the file. Nevertheless, it should be understood that such descriptions are applicable to computing devices in general.

The techniques described in this disclosure may be usable with various video coding standards, including video coding techniques that are not related to a specific video coding standard. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In some examples, video encoder 20 and video decoder 30 operate according to a video compression standard, such as the HEVC standard. In addition to the base HEVC standard, there are ongoing efforts to produce scalable video coding, multi-view video coding, and 3D coding extensions for HEVC. HEVC, a multi-view extension to HEVC, named MV-HEVC, and a scalable extension to HEVC, named SHVC, have recently been finalized by the Joint Collaboration Team on Video Coding (JCT-VC) of ITU-T Video Coding Experts Group (VCEG) and ISO/IEC Motion Picture Experts Group (MPEG). The HEVC standard may also be referred to as Rec. ITU-T H.265|ISO/IEC 23008-2.

A HEVC draft specification entitled "Draft high efficiency video coding (HEVC) version 2, combined format range extensions (RExt), scalability (SHVC), and multi-view (MV-HEVC) extensions" for JCT-VC of ITU-T SG 16 WP 3 and ISO/IEC JTC 1/SC 29/WG 11 18$^{th}$ Meeting: Sapporo, JP, 30 Jun.-9 Jul. 2014 (JCTVC-R1013_v6), (referred to hereinafter as "JCTVC-R1013" or "Rec. ITU-T H.265| ISO/IEC 23008-2") is available from http://phenix.int-evry.fr. MV-HEVC is incorporated as Annex G of Rec. ITU-T H.265 | ISO/IEC 23008-2. SHVC is incorporated as Annex H of Rec. ITU-T H.265 | ISO/IEC 23008-2.

In HEVC and other video coding standards, a video sequence typically includes a series of pictures. Pictures may also be referred to as "frames." A picture may include one or more sample arrays. For instance, a picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a scanning order, such as a raster scanning order. In this disclosure, the term "coded picture" or "encoded picture" may refer to a coded representation of a picture containing all coding tree units of the picture.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive blocks for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks of a CU into one or more transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity.

After generating a coefficient block, video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. For instance, a first type of NAL unit may encapsulate an RBSP for a PPS, a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. For instance, JCTVC-R1013 defines the term VCL NAL unit is a collective term for coded slice segment NAL units and the subset of NAL units that have reserved values of nal_unit_type that are classified as VCL NAL units in JCTVC-R1013. SEI contains information that is not necessary to decode the samples of coded pictures from VCL NAL units.

In the example of FIG. 1, video decoder 30 receives a bitstream generated by video encoder 20. In some examples, video decoder 30 receives the bitstream after destination device 14 or another device obtains the bitstream from a file. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

As briefly indicated above, NAL units may encapsulate RBSPs for video parameter sets (VPSs), sequence parameter sets (SPSs), picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e., a texture picture) or a depth view component (i.e., a depth picture).

In MV-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of multi-view or 3-dimensional video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding, higher layers may include additional view components. In SHVC, higher layers may include signal to noise ratio (SNR) enhancement data, spatial enhancement data, and/or temporal enhancement data. In MV-HEVC and SHVC, a layer may be referred to as a "base layer" if a video decoder can decode pictures in the layer without reference to data of any other layer. The base layer may conform to the HEVC base specification (e.g., Rec. ITU-T H.265 | ISO/IEC 23008-2).

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include nuh_reserved_zero_6bits syntax elements, which may also be referred to as nuh_layer_id syntax elements. NAL units that have nuh_layer_id syntax elements that specify different values belong to different "layers" of a bitstream. Thus, in multi-view coding, MV-HEVC, SVC, or SHVC, the nuh_layer_id syntax element of the NAL unit specifies a layer identifier (i.e., a layer ID) of the NAL unit. The nuh_layer_id syntax element of a NAL unit is equal to 0 if the NAL unit relates to a base layer in multi-view coding, MV-HEVC or SHVC. Data in a base layer of a bitstream may be decoded without reference to data in any other layer of the bitstream. If the NAL unit does not relate to a base layer in multi-view coding, MV-HEVC or SHVC, the nuh_layer_id syntax element may have a non-zero value. In multi-view coding, different layers of a bitstream may correspond to different views. In SVC or SHVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include temporal_id syntax elements. The temporal_id syntax element of a NAL unit specifies a temporal identifier of the NAL unit. The temporal identifier of a NAL unit identifies a temporal sub-layer with which the NAL unit is associated. Thus, each temporal sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. In some examples, each operation point of a bitstream may be associated with a set of layer identifiers (i.e., a set of nuh_reserved_zero_6bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may be a bitstream created from another bitstream by operation of the sub-bitstream extraction process with another bitstream, a target highest TemporalId, and a target layer identifier list as inputs to the sub-bitstream extraction process. The operation point may include each NAL unit that is associated with the operation point. The operation point does not include VCL NAL units that are not associated with the operation point.

An output layer set (OLS) is a set of layers consisting of the layers of one of the layer sets specified in the VPS, where one or more layers in the set of layers are indicated to be output layers. Particularly, the layer_set_idx_for_ols_minus1[i] syntax element, plus 1, specifies an index of the i-th output layer set. The output_layer_flag[i][j] syntax element equal to 1 specifies that the j-th layer in the i-th OLS is an output layer. The output_layer_flag[i][j] syntax element equal to 0 specifies that the j-th layer in the i-th OLS is not an output layer.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and limits that is supported by all video decoders conforming to that profile. Video encoders are not required to make use of all features supported in a profile.

Each level of a tier may specify a set of limits on the values that syntax elements and variables may have. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier, and level supported for that profile may also be expressed. Some video decoders may not be able to decode particular profiles, tiers, or levels.

In HEVC, profiles, tiers, and levels may be signaled by the syntax structure profile_tier_level( ) syntax structure. The profile_tier_level( ) syntax structure may be included in a VPS and/or a SPS. The profile_tier_level( ) syntax structure may include a general_profile_idc syntax element, a general_tier_flag syntax element, and a general_level_idc syntax element. The general_profile_idc syntax element may indicate a profile to which a CVS conforms. The general_tier_flag syntax element may indicate a tier context for interpretation of the general_level_idc syntax element. The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

File format standards include the ISO base media file format (ISOBMFF, ISO/IEC 14496-12), and others derived from the ISOBMFF, including MPEG-4 file format (ISO/IEC 14496-15), 3GPP file format (3GPP TS 26.244) and AVC file format (ISO/IEC 14496-15). The draft texts of the new editions for ISO/IEC 14496-12 and 14496-15 are available at http://phenix.int-evey.fr/.

The ISOBMFF is used as the basis for many codec encapsulation formats, such as the AVC file format, as well as for many multimedia container formats, such as the MPEG-4 file format, the 3GPP file format (3GPP), and the DVB file format. Although originally designed for storage, the ISOBMFF has proven to be very valuable for streaming, e.g. for progressive download or DASH. For streaming purposes, the movie fragments defined in ISOBMFF can be used.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is the elementary syntax structure in the ISOBMFF. A box includes a four-character coded box type, the byte count of the box, and the payload. An ISOBMFF file consists of a sequence of boxes, and boxes may contain other boxes. A Movie box ("moov") contains the metadata for the continuous media streams that is present in the file, each one represented in the file as a track. The metadata for a track is enclosed in a Track box ("trak"), while the media content of a track is either enclosed in a Media Data box ("mdat") or directly in a separate file. The media content for tracks may comprise or consist of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. For example, a track box includes a Sample Table ('stbl') box. A Sample Table box of a track contains a sample table that contains all the time and data indexing of the media samples of the track. The sample table includes sample entries for specific samples of the track. A sample of a track may include a syntax element identifying a sample entry applicable to the sample. Thus, when a device is processing a sample (e.g., preparing to decode encoded pictures of the sample, forward the sample, extract the sample, etc.), the device may be able to refer back to a sample entry in the Sample Table box to determine how to process the sample.

More specifically, a Sample Table box may include a Sample Description ('stbl') box. The Sample Description box may include detailed information about a coding type used, and any initialization information needed for that decoding. To accomplish this, the Sample Description box includes a set of Sample Entry box (i.e., sample entries). The following code defines the Sample Entry and Sample Description box classes of boxes in the ISOBMFF.

```
aligned(8) abstract class SampleEntry (unsigned int(32)
format)
    extends Box(format){
    const unsigned int(8)[6] reserved = 0;
    unsigned int(16) data_reference_index;
}
aligned(8) class SampleDescriptionBox (unsigned int(32)
handler_type)
    extends FullBox('stsd', version, 0){
    int i ;
    unsigned int(32) entry_count;
    for (i = 1 ; i <= entry_count ; i++){
        SampleEntry( );    // an instance of a class derived
from SampleEntry
    }
}
```

In the ISOBMFF, a Sample Entry class is an abstract class that is extended for specific media types. For example, a VisualSampleEntry class extends the SampleEntry class and contains information for video data. Similarly, an AudioSampleEntry class extends the SampleEntry class and contains information for audio data. The following code defines the AudioSampleEntry class in the ISOBMFF.

```
class VisualSampleEntry(codingname) extends SampleEntry
(codingname){
    unsigned int(16) pre_defined = 0;
    const unsigned int(16) reserved = 0;
    unsigned int(32)[3] pre_defined = 0;
    unsigned int(16)  width;
    unsigned int(16)  height;
    template unsigned int(32)  horizresolution = 0x00480000;
// 72 dpi
    template unsigned int(32)  vertresolution = 0x00480000;
// 72 dpi
    const unsigned int(32) reserved = 0;
    template unsigned int(16) frame_count = 1;
    string[32] compressorname;
    template unsigned int(16) depth = 0x0018;
    int(16) pre_defined = -1;
    // other boxes from derived specifications
    CleanApertureBox      clap;       // optional
    PixelAspectRatioBox   pasp;       // optional
}
```

Furthermore, the VisualSampleEntry class can be extended for even more specific purposes, such as defining data for specific codecs. For example, the following code defines an HEVCSampleEntry class that extends the VisualSampleEntry class and contains information specific to HEVC.

```
class HEVCSampleEntry( ) extends VisualSampleEntry ('hvc1'
or 'hev1'){
    HEVCConfigurationBox config;
    MPEG4BitRateBox ( );              // optional
    MPEG4ExtensionDescriptorsBox ( ); // optional
    Box extra_boxes[ ];               // optional
}
```

As shown in the code above, the HEVCSampleEntry class includes an instance of the HEVCConfigurationBox class. The HEVCConfigurationBox includes an instance of a HEVCDecoderConfigurationRecord class. Instances of the HEVCDecoderConfigurationRecord class may include syntax elements specifying information a decoder may use to decode coded pictures in a sample to which a sample entry containing the instance of the HEVCDecoderConfigurationRecord applies.

Furthermore, an LHEVCSampleEntry class has been defined that extends the VisualSampleEntry class and contains information specific to L-HEVC. The LHEVCSampleEntry may be used in tracks that are not HEVC compatible. For example, if a track of a file includes only a base layer of a multi-layer bitstream, the track may include instances of the HEVCSampleEntry class. However, in this example, other tracks of the file carrying other layers of the multi-layer bitstream may include instances of the LHEVCSampleEntry class. As shown in the following code, the LHEVCSampleEntry class includes an instance of a LHEVCConfigurationBox, and the LHEVCConfigurationBox includes an LHEVCDecoderConfigurationRecord box.

```
class LHEVCConfigurationBox extends Box('lhvC') {
    LHEVCDecoderConfigurationRecord( ) LHEVCConfig;
}
class HEVCLHVCSampleEntry( ) extends HEVCSampleEntry( ) {
    LHEVCConfigurationBox    lhvcconfig;
}
// Use this if track is not HEVC compatible
class LHEVCSampleEntry( ) extends VisualSampleEntry ('lhv1',
or 'lhe1') {
    LHEVCConfigurationBox    lhvcconfig;
    MPEG4ExtensionDescriptorsBox ( ); // optional
}
```

Specific boxes within a Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

Another example sample group is a layer information ("linf") sample group. A sample group description entry for a layer information sample group comprises a list of layers and sub-layers that a track contains. Each sample of a track that contains a coded picture of a layer may be part of a 'linf' sample group of the track. There may be one or more 'linf' sample group entries in a sample group description box for a track. However, it may be a requirement that there is one 'linf' sample group description entry for each track that includes L-HEVC data. The following provides a syntax and semantics for a sample group description entry for a 'linf' sample group.

9.8.2.2 Syntax

```
class LayerInfoGroupEntry extends VisualSampleGroupEntry ('linf')) {
    unsigned int (2) reserved;
    unsigned int (6) num_layers_in_track;
    for (i=0; i<num_layers_in_track; i++) {
        unsigned int (4) reserved;
        unsigned int (6) layer_id;
        unsigned int (3) min_sub_layer_id;
        unsigned int (3) max_sub_layer_id;
    }
}
```

9.8.2.3 Semantics num_layers_in_track: The number of layers carried in any sample of this track associated with this sample group.

layer_id: Layer IDs for the layers carried in associated samples. The instances of this field shall be in ascending order in the loop.

min_sub_layer_id: The minimum Temporand value for the sub-layers in the layer within the track.

1. max_sub_layer_id: The maximum Temporand value for the sub-layers in the layer within the track.

2. Let layerList be the list of layer IDs of layers that are carried in this track and the layer IDs of layers that are carried in other tracks and that are referred to by layers carried in this track directly or indirectly. The layer IDs in the layerList are ordered in ascending order of layer ID values. For example, suppose that this track carries layers with layer IDs 4 and 5 and they refer to layers with layer ID equal to 0 and 1, then the layerList associated with this track is {0, 1, 4, 5}.

The ISOBMFF specification specifies six types of Stream Access Points (SAPs) for use with DASH. The first two SAP types (types 1 and 2), correspond to Instantaneous Decoding Refresh (IDR) pictures in H.264/AVC and HEVC. The third SAP type (type 3) corresponds to open-Group of Pictures (GOP) random access points hence Broken Link Access (BLA) or Clean Random Access (CRA) pictures in HEVC. The fourth SAP type (type 4) corresponds to GDR random access points.

In the current draft specification for 14496-15 for storage of L-HEVC layers in the file format, a list of operation points available for a bitstream in a file is described using the operation point ('oinf') sample group that is signaled in one of the tracks carrying the bitstream. The operation point sample group may also be referred to herein as the "operation point information sample group." An application can find that track by following an 'oref' track reference. For simplicity, the track that contains the 'oinf' sample group is also referred to as the 'oref' track. Although the 'oinf' sample group is signaled only in one track, in the current draft specification for 14496-15 for storage of L-HEVC layers, the scope of the 'oinf' sample group covers all tracks that carry L-HEVC coded data. Signaling the list of operation points using a sample group has a consequence such that the list of operation points may not cover the whole bitstream in the temporal dimension. More than one 'oinf' sample group may be present and each sample group includes a different set of samples.

Figure 2:
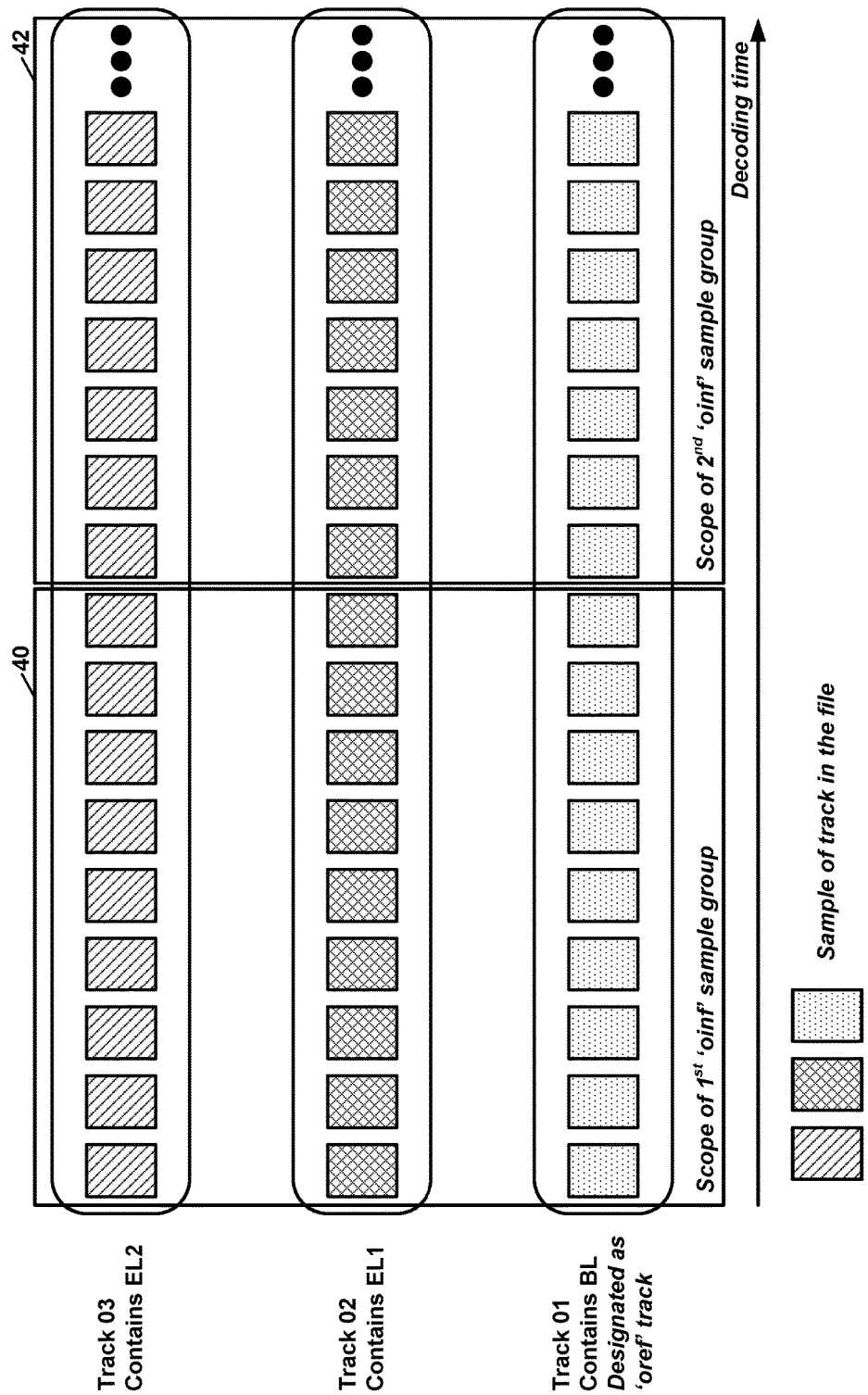
FIG. 2 is a conceptual diagram illustrating an example of coverage of 'oinf' sample groups.

FIG. 2 is a conceptual diagram illustrating an example of coverage of 'oinf' sample groups. FIG. 2 illustrates the coverage of two 'oinf' sample groups (40 and 42) according to the current draft specification for 14496-15 for storage of L-HEVC layers. As shown in the example of FIG. 2, sample group 40 and sample group 42 each include samples in track 01, track 02, and track 03. In the example of FIG. 2, track 01 includes a base layer (BL). Track 02 includes an elementary stream EL1, which may contain one or more layers. Track 03 includes an elementary stream EL2, which may contain one or more additional layers. In the example of FIG. 2, each respective shaded rectangle corresponds to a single respective sample. Track 01 is the 'oref' track in FIG. 2. In other examples, a track other than a track carrying a base layer can be the 'oref' track. Each respective sample of the operation point reference track and each respective sample of the additional tracks comprises a respective access unit that comprises one or more encoded pictures corresponding to the same time instance.

The above techniques of signaling operation points may have problems when samples in different tracks are not aligned, in the sense that for some access units (or some decoding time instances) there are NAL units in some tracks but not in the other tracks. Since an operation point is signaled at the file level using a sample group, in the temporal dimension, the sample group can include only samples that are present in the track that contains the sample group, or at most samples with decoding times with certain ranges. Thus, there can be samples in other tracks with decoding times outside of the ranges that can be clearly specified by the sample groups in a particular track. Details of the problems are described in the text below.

For example, when frame or picture rates of layers in a bitstream are different and the EL is carried in a different track from the BL, there are samples in the track carrying the EL that are not covered by any oinf sample groups and there may be samples in the track carrying the EL not within the decoding time range of any of the 'oinf' sample groups. For example, when a frame rate of an EL is double of that of the BL, there are samples in the track carrying the EL that are not covered by any 'oinf' sample groups.

Figure 3:
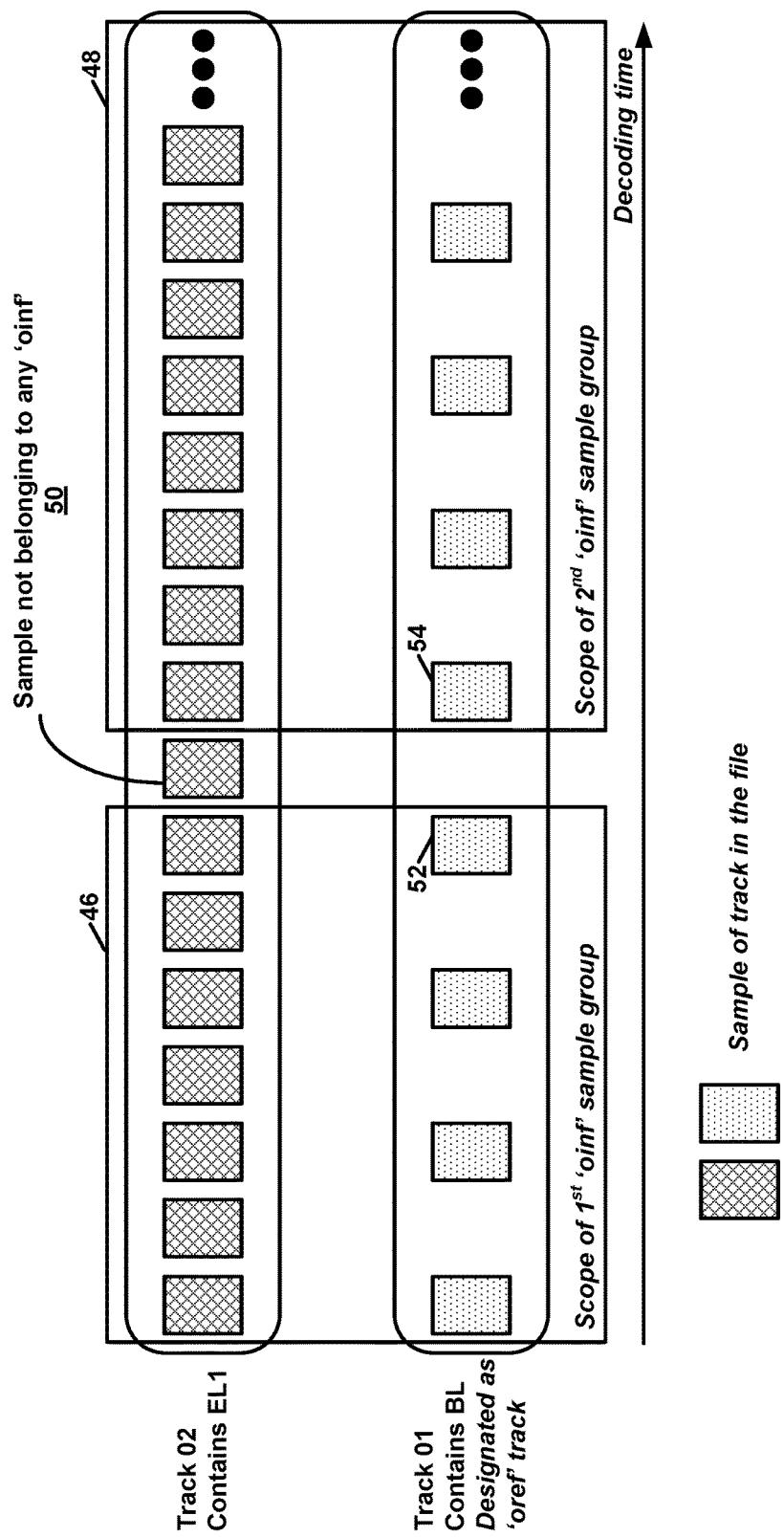
FIG. 3 is a conceptual diagram illustrating an example 'oinf' sample group problem when dealing with tracks of different frame rate.

FIG. 3 illustrates an example problem that occurs when tracks contain layers with different frame or picture rates. In the example of FIG. 3, a bitstream includes a base layer and one or more enhancement layers. An operation point reference track (i.e., the 'oref' track) contains the base layer and each respective track of one or more additional tracks contain a respective enhancement layer of one or more enhancement layers. Particularly, in FIG. 3, Track 01 contains the base layer and Track 02 contains an enhancement layer (denoted EL1 in FIG. 3).

In the example of FIG. 3, a file includes a first oinf sample group 46 and a second 'oinf' sample group 48. At the grouping transition point from one 'oinf' to another 'oinf' sample group, a sample 50 in Track 02 with a decoding time between the last sample of the first oinf sample group and the first sample of the second oinf sample group does not have a temporally collocated sample in Track 01, and does not belong to any 'oinf' sample group.

Thus, in the example of FIG. 3 and other examples, an operation point available in a bitstream in a file is described in the file using a first operation point information sample group (e.g., oinf sample group 46 in FIG. 3) that is signaled in the operation point reference track (e.g., Track 01 in FIG. 3). The first operation point information sample group comprises a first set of samples in the operation point reference track. Furthermore, the operation point reference track contains a second operation point sample group that comprises a second set of samples in the operation point reference track. In this example, there is no sample in the operation point reference track occurring at a decoding time between a decoding time of a sample having a latest decoding time among the first set of samples (e.g., sample 52 in FIG. 3) and a sample having an earliest decoding time among the second set of samples (e.g., sample 54 in FIG. 3). Furthermore, there are one or more samples (e.g., sample 50 in FIG. 3) in a particular additional track (e.g., Track 02 in FIG. 3) of the one or more additional tracks that have decoding times between the decoding time of the sample having the latest decoding time among the first set of samples and the sample having the earliest decoding time among the second set of samples. In some instances, the particular additional track (e.g., Track 02 in FIG. 3) has a higher frame rate than the operation point reference track.

The fact that the designated 'oref' track that contains oinf sample groups is found by following the 'oref' track reference has a consequence that there can be only one track for the entire bitstream that can contain 'oinf' sample groups, since the track reference cannot be changed once the track reference is specified in the track header. Due to this fixed designation of the track that can contain the oinf sample group and the fact that the 'oinf' sample group can include only samples that are present in the track that contains the 'oinf' sample group, some samples in tracks other than the 'oref' track may not belong to any 'oinf' sample group if there is no sample in certain temporal period in the 'oref' track.

Figure 4:
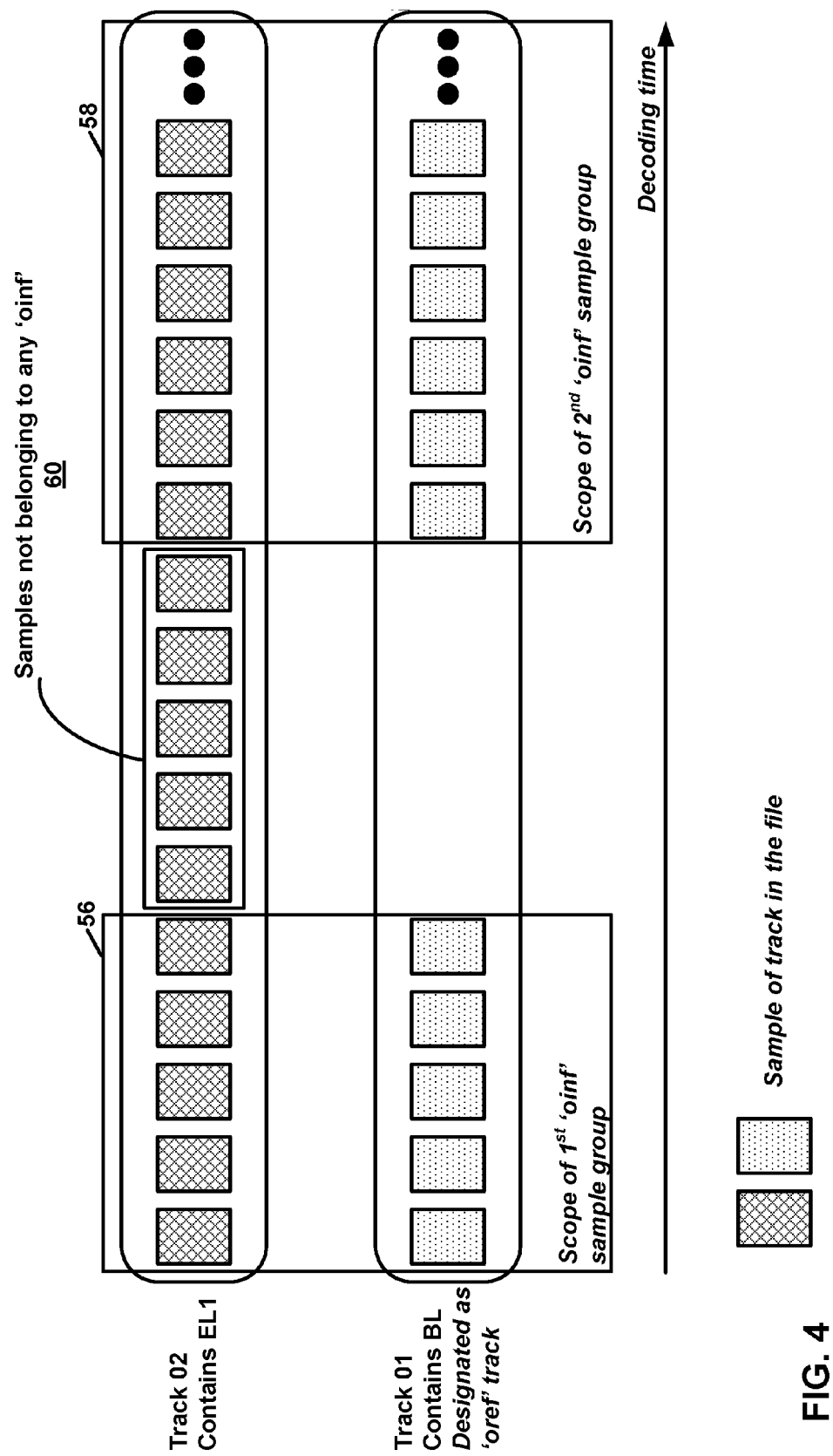
FIG. 4 is a conceptual diagram illustrating an example 'oinf' sample group problem when dealing with no sample in 'sbas' for a certain temporal period.

FIG. 4 illustrates an example problem that occurs when the 'oref' track has no sample for certain temporal period. In the example of FIG. 4, a file includes a first 'oinf' sample group 56 and a second 'oinf' sample group 58. As shown in the example of FIG. 4, all samples 60 in the track other than the 'oref' track at the temporal period where there is no sample at the 'oref' track do not belong to any 'oinf' sample group. Additionally, as shown in FIG. 4, there is no possibility to have an 'oinf' sample group in Track 02 as the 'oref' track cannot be changed once the 'oref' track is specified by an 'oref' track reference in the track header.

This disclosure proposes several techniques to solve the above problems. Some of the techniques may be applied independently and some of them may be applied in combination. The techniques may be beneficial for reasons in addition to solving the above described problems.

In accordance with a first technique of this disclosure, the following may be applied for samples in the tracks that are not the 'oref' track:

a. A sample in a track other than the 'oref' track is part of the same 'oinf' sample group as its temporally collocated sample in the 'oref' track. For a particular sample in a track, the temporally collocated sample in another track is the one with the same decoding time as that of this particular sample.

b. If a sample spA in a track other than the 'oref' track has no temporally collocated sample in the 'oref' track, the sample is considered as part of the 'oinf' sample group of the last sample in the 'oref' track before spA. This process can be recursively applied. Alternatively or additionally, in this case the sample is considered as part of the 'oinf' sample group of the first sample in the 'oref' track after spA.

By applying the statements above, sample 50 of FIG. 3 is included in 'oinf' sample group 46 because sample 50 is in a track (i.e., Track 02) other than the 'oref' track (i.e., Track 01) and has no temporally collocated sample in the 'oref' track. Hence, sample 50 is considered as part of the 'oinf' sample group of the last sample (i.e., sample 52) before sample 50. Similarly, in the sample of FIG. 4, samples 60 are in a track (i.e., Track 02) other than the 'oref' track (i.e., Track 01) and have no temporally collocated samples in the 'oref' track. Hence, samples 60 are considered as part of the oinf sample group of the last sample of the 'oref' track before samples 60.

Thus, in an example of the first technique, a device, such as source device 12, file generation device 34, or another device, may generate an operation point reference track in the file. In general, generating a track may comprise storing data, such as samples of a track and/or metadata of the track, into a file. As part of generating the operation point reference track, the device may signal, in the operation point reference track, an operation point information sample group that describes an operation point available for a bitstream in the file. In general, signaling a sample group may comprise storing, in a file, a sample-to-group box indicating samples of the sample group and a sample group description entry describing the sample group. Furthermore, the device may generate one or more additional tracks in the file. No operation point information sample group is signaled in any of the additional tracks. Furthermore, based on the operation point reference track containing a sample that is temporally collocated with the respective sample in the respective additional track, the respective sample in the respective additional track is considered part of the operation point information sample group. Based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

Similarly, in an example of the first technique, a device, such as destination device 14, a MANE, or another device, may obtain an operation point reference track in the file. Obtaining data, such as the operation point reference track, may comprise reading the data, parsing the data, or otherwise performing some action to get, acquire, or come into possession of the data. An operation point available for a bitstream in the file is described in the file using an operation point information sample group that is signaled in the operation point reference track. Furthermore, the device may obtain one or more additional tracks in the file. No operation point information sample group is signaled in any of the additional tracks. For each respective sample of each respective additional track of the one or more additional tracks, the device may determine whether to consider the respective sample part of the operation point information sample group. Based on the operation point reference track containing a sample that is temporally collocated with the respective sample in the respective additional track, the respective sample in the respective additional track is considered part of the operation point information sample group. Based on the operation point reference track not containing a sample that is temporally collocated with the respective sample in the respective additional track, the respective sample in the respective additional track is considered part of an operation point information sample group of the last sample in the operation point reference track before the respective sample of the respective additional track. Furthermore, in some examples, the device may perform a sub-bitstream extraction process that extracts the operation point from the bitstream.

This following text describes an example implementation of the first technique. Throughout this disclosure, insertions to the current L-HEVC file format (e.g., the current draft specification for 14496-15) are enclosed in <ins> . . . </ins>tags (e.g., <ins>added text</ins>) and removed text is enclosed in <dlt> . . . </dlt>tags (e.g., <dlt>deleted text</dlt>).

9.8.1 The Operating Points Information Sample Group
9.8.1.1 Definition
Box Type: 'oinf'
Container: SampleGroupDescriptionBox ('sgpd') of the 'oref' type referenced track
Mandatory: Yes in one and only one track of an L-HEVC bit stream
Quantity: One or more oinf sample group entries
Applications are informed about the different operating points relevant for a given sample and their constitution by using the Operating Points Information sample group ('oinf'). Each operating point is related to an output layer set, a max T-ID value, and a profile, level and tier signaling. All these information is captured by the 'oinf' sample group. Apart from these information, this sample group also provides the dependency information between layers, the types of scalabilities coded in the L-HEVC bit stream, and the dimension identifiers that relate to any particular layer for a given scalability type.
For all tracks of an L-HEVC bitstream, there shall be only one track among this set that carries an 'oinf' sample group. All tracks of an L-HEVC bitstream shall have a track reference of type 'oref' to the track that carries the 'oinf' sample group.
When several VPS are present in a L-HEVC bitstream, it may be needed to declare several Operating Points Information sample groups. For more common cases where a single VPS is present, it is recommended to use the default sample group mechanism defined in ISO/IEC 14496-12 and include the Operating Points Information sample group in the track sample table, rather than declaring it in each track fragment.
<ins>For a particular sample in a track, the temporally collocated sample in another track is the one with the same decoding time as that of this particular sample.
For tracks other than the 'oref' track, the follow applies:
A sample in a track other than the 'oref' track is part of the same 'oinf' sample group as its temporally collocated sample in the 'oref' track.
If a sample spA in a track other than the 'oref' track has no temporally collocated sample in the 'oref' track, the sample is considered as part of the 'oinf' sample group of the last sample in the 'oref' track before spA. This process can be recursively applied.</ins>
In accordance with a second technique of this disclosure, instead of using an 'oref' track reference to resolve the track that contains 'oinf' sample groups, the track that contains the 'oinf' sample group is indicated in a layer information ('linf') sample group. This may allow the 'oinf' sample group to be present in different tracks for different temporal periods.

For instance, with reference to FIG. 4, sample group description boxes for Track 01 and Track 02 may each include respective 'linf' sample group description entries that include respective 'oinf' track identifier elements that specify respective track identifiers of tracks that contains 'oinf' sample groups associated with Track 01 and Track 02. Furthermore, in FIG. 4, the 'oinf' track identifier element in the 'linf' sample group description entry for Track 02 may indicate Track 02 includes the 'oinf' sample group. Thus, the 'oinf' sample group of Track 02 may include samples 56. However, if each sample in a first track is aligned with a respective sample in a second track and an 'oinf' sample group is defined for the second track, it may be more efficient for the first track to refer to the 'oinf' sample group of the second track than for an 'oinf' sample group to be directly defined in the first track.

Thus, in an example of the second technique, a device, such as source device 12 or another device, may generate a first track in a file. In this example, the first track contains a sample group description entry for a layer information sample group. Additionally, in this example, the device generates a second track in the file. The second track contains a sample group description entry for an operation point information sample group that lists operation points available for a bitstream in the file. In this example, the device may use data indicated in the first track to identify the second track as containing the sample group description entry for the operation point information sample group.

In another example of the second technique, a device, such as destination device 14 or another device, obtains a first track in a file. The first track contains a sample group description entry for a layer information sample group. Additionally, the device obtains a second track in the file. In this example, the second track contains a sample group description entry for an operation point information sample group that lists operation points available for a bitstream in the file. Furthermore, in this example, the device may use data indicated in the first track to identify the second track as containing the sample group description entry for the operation point information sample group.

In a third technique, the 'oinf' sample group and the 'linf' sample group are temporally aligned such that samples belonging to the same 'oinf' sample group also belong to the same 'linf' sample group. For instance, building on the second technique described above, it may be a requirement or constraint on a file format that, for each sample sA in track tA that belongs to a 'linf' sample group 1A and sample sB in track tB that belongs to a 'linf' sample group 1B, where sA and sB are temporally collocated, a sample sC that is in track tA and also belongs to 'linf' sample group 1A is temporally collocated with a sample sD that is in track tB, then sample sD must belong to 'linf' sample group 1B. Moreover, it may be a requirement or constraint on a file format that, for each sample sA in track tA that belongs to a 'oref' sample group oA and sample sB in track tB that belongs to an 'oref' sample group oB, where sA and sB are temporally collocated, a sample sC that is in track tA and also belongs to 'oref' sample group oA is temporally collocated with a sample sD that is in track tB, then sample sD must belong to 'oref' sample group oB.

Thus, in an example of the third technique, a device, such as source device 12 or another device, may generate a first track in a file. In this example, the first track contains a sample group description entry for a layer information sample group. Additionally, in this example, the device generates a second track in the file. In this example, the second track contains a sample group description entry for an operation point information sample group that lists operation points available for a bitstream in the file. In this example, the layer information sample group and the operation point information sample group are temporally aligned such that samples belonging to the operation point information sample group also belong to the same layer information sample group.

Similarly, in an example of the third technique, a device, such as destination device 14 or another device, may obtain a first track in a file. In this example, the first track contains a sample group description entry for a layer information sample group. Additionally, in this example, the device obtains a second track in the file. In this example, the second track contains a sample group description entry for an operation point information sample group that lists operation points available for a bitstream in the file. In this example, the layer information sample group and the operation point information sample group are temporally aligned such that samples belonging to the operation point information sample group also belong to the same layer information sample group.

The text below show changes to the current draft specification for 14496-15 for an implementation for the second and third techniques described above.

9.8.1 The Operating Points Information Sample Group
9.8.1.1 Definition
Box Type: 'oinf'
Container: SampleGroupDescriptionBox ('sgpd') of the 'oref' type referenced track
Mandatory: Yes in one and only one track of an L-HEVC bit stream
Quantity: One or more 'oinf' sample group entries
Applications are informed about the different operating points relevant for a given sample and their constitution by using the Operating Points Information sample group ('oinf'). Each operating point is related to an output layer set, a max T-ID value, and a profile, level and tier signaling. All these information is captured by the 'oinf' sample group. Apart from these information, this sample group also provides the dependency information between layers, the types of scalabilities coded in the L-HEVC bit stream, and the dimension identifiers that relate to any particular layer for a given scalability type.
<dlt>For all tracks of an L-HEVC bitstream, there shall be only one track among this set that carries an 'oinf' sample group. All tracks of an L-HEVC bitstream shall have a track reference of type 'oref' to the track that carries the 'oinf' sample group.</dlt>
<ins>A track that carries the 'oinf' sample group is identified by the oinf_track_id field signaled in the Layer Information ('linf') sample group. The 'linf' sample group and the 'oinf' sample group are temporally aligned such that samples that belong to the same 'oinf' sample group also belong to the same 'linf' sample group.</ins>
When several VPS are present in a L-HEVC bitstream, it may be needed to declare several Operating Points Information sample groups. For more common cases where a single VPS is present, it is recommended to use the default sample group mechanism defined in ISO/IEC 14496-12 and include the Operating Points Information sample group in the track sample table, rather than declaring it in each track fragment.
9.8.2 The Layer Information Sample Group
9.8.2.1 Definition
Box Type: 'linf'
Container: SampleGroupDescriptionBox ('sgpd')
Mandatory: Yes in every L-HEVC tracks
Quantity: One or more 'linf' sample group entries
The list of layers and sub layers a track carries is signaled in the Layer Information sample group. Every L-HEVC track shall carry a 'linf' sample group.
9.8.2.2 Syntax

```
class LayerInfoGroupEntry extends VisualSampleGroupEntry
('linf')) {
    unsigned int (2) reserved;
    unsigned int (6) num_layers_in_track;
    for (i=0; i<num_layers_in_track; i++) {
        unsigned int (4) reserved;
        unsigned int (6) layer_id;
        unsigned int (3) min_sub_layer_id;
        unsigned int (3) max_sub_layer_id;
    }
    <ins>unsigned int (32) oinf_track_id;</ins>
}
```

9.8.2.3 Semantics
num_layers_in_track: The number of layers carried in any sample of this track associated with this sample group.

layer_id: Layer IDs for the layers carried in associated samples. The instances of this field shall be in ascending order in the loop.

min_sub_layer_id: The minimum Temporand value for the sub-layers in the layer within the track.

max_sub_layer_id: The maximum Temporand value for the sub-layers in the layer within the track.

<ins>oinf_track_id: The track ID of the track that contains the associated 'oinf' sample group.</ins>

In a fourth technique, a "dummy" sample entry may be generated for a track. The "dummy" sample entry is not applicable to any sample in the track, and may contain parameter sets that may only be used by some other tracks containing layers that depend on the layers in this track. In some examples, the "dummy" sample entry includes information describing operation points or index values pointing to operation points signaled in an oinf box. Thus, in the example of FIG. 4, the Sample Table box for Track 01 may include a "dummy" sample entry and a device interpreting the file may refer to the "dummy" sample entry of Track 01 when interpreting Track 02.

In an example of the fourth technique, a device, such as source device 12 or another device, generating one or more tracks in a file. Additionally, in this example, the device generates an additional track in the file. In this example, the additional track contains a particular sample entry that is not applicable to any sample in the additional track. In this example, the particular sample entry contains a parameter set that may only be used by the one or more tracks that contain layers that depend on the layers in the additional track.

Similarly, in an example of the fourth technique, a device, such as destination device 14 or another device, obtains one or more tracks in a file. Additionally, in this example, the device obtains an additional track in the file. In this example, the additional track contains a particular sample entry that is not applicable to any sample in the additional track. Furthermore, in this example, the particular sample entry contains a parameter set that may only be used by the one or more tracks that contain layers that depend on the layers in the additional track.

In a fifth technique, the list of operation points is not signaled through a sample group. Instead, the list of operation points is signaled in its own box (e.g., an 'oinf' box) within the 'oref' track. For instance, as noted above, a Sample Table box of a track may include sample entries containing information regarding respective samples of the track. In the draft of the extension of the ISO base media file format for L-HEVC, a sample entry may include an instance of a LHEVCDecoderConfigurationRecord class. In accordance with an example of the fifth technique, a sample entry of each track may include a list of indices to the list of operation points signaled in the 'oinf' box. The list of operation points in the sample entry is the list of operation points that apply to the samples the sample entry applies to.

Thus, in an example of the fifth technique, as part of generating a file, a device (e.g., source device 12 or another device) may signal a list of operation points in a box within a track containing a sample group description entry specifying an operation point information sample group that lists operation points available for a bitstream in the file. In this example, boxes of a type to which the box belongs are designated only for containing sample group description entries specifying operation point information sample groups. Similarly, in another example of the fifth technique, as part of generating a file, a device (e.g., destination device 14 or another device) may obtain a list of operation points in a box within a track containing a sample group description entry specifying an operation point information sample group that lists operation points available for a bitstream in the file. In this example, boxes of a type to which the box belongs are designated only for containing sample group description entries specifying operation point sample groups.

The text below shows example changes to the current draft specification for 14496-15 to implement the fifth technique.

9.6.3 Decoder Configuration Record

When the decoder configuration record defined in clause 8.3.3.1 is used for a stream that can be interpreted as either an L-HEVC or HEVC stream, the HEVC decoder configuration record shall apply to the HEVC compatible base layer, and should contain only parameter sets needed for decoding the HEVC base layer.

The syntax of LHEVCDecoderConfigurationRecord is as follows:

```
aligned(8) class LHEVCDecoderConfigurationRecord {
    unsigned int(8) configurationVersion = 1;    bit(4) reserved = '1111'b;
    unsigned int(12) min_spatial_segmentation_idc;
    bit(6) reserved = '111111'b;
    unsigned int(2) parallelismType;
    bit(2) reserved = '11'b;
    bit(3) numTemporalLayers;
    bit(1) temporalIdNested;
    unsigned int(2) lengthSizeMinusOne;
    unsigned int(8) numOfArrays;
    for (j=0; j < numOfArrays; j++) {
        bit(1) array_completeness;
        unsigned int(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
    <ins>unsigned int(16) numOfAvailableOPs;
    for (j=0; j < numOfAvailableOPs; j++) {
        unsigned int(16) op_idx;</ins>
    }
}
```

The semantics of the fields that are common to LHEVCDecoderConfigurationRecord and HEVCDecoderConfigurationRecord remain unchanged.

NOTE A track may represent more than one output layer set.

NOTE For each auxiliary picture layer included in the track, it is recommended to include, within nalUnit, an SEI NAL unit containing a declarative SEI message, such as the depth representation information SEI message for depth auxiliary picture layers, specifying characteristics of the auxiliary picture layer.

<ins>num_operating_points: Gives the number of operating points that apply to the samples this sample entry applies to.

Op_idx: Gives the index to the list of operation points signaled in the 'oinf' box.</ins>

This disclosure proposes several techniques. Some of these techniques may be applied independently and some of them may be applied in combination.

The techniques of this disclosure for generating or processing a file may be performed by source device 12, destination device 14, or another device. For instance, a device may receive encoded video data from source device 12 and generate a file based on the encoded video data.

Similarly, a device may receive and process a file. This device may provide encoded video data from the file to destination device 14.

Figure 5:
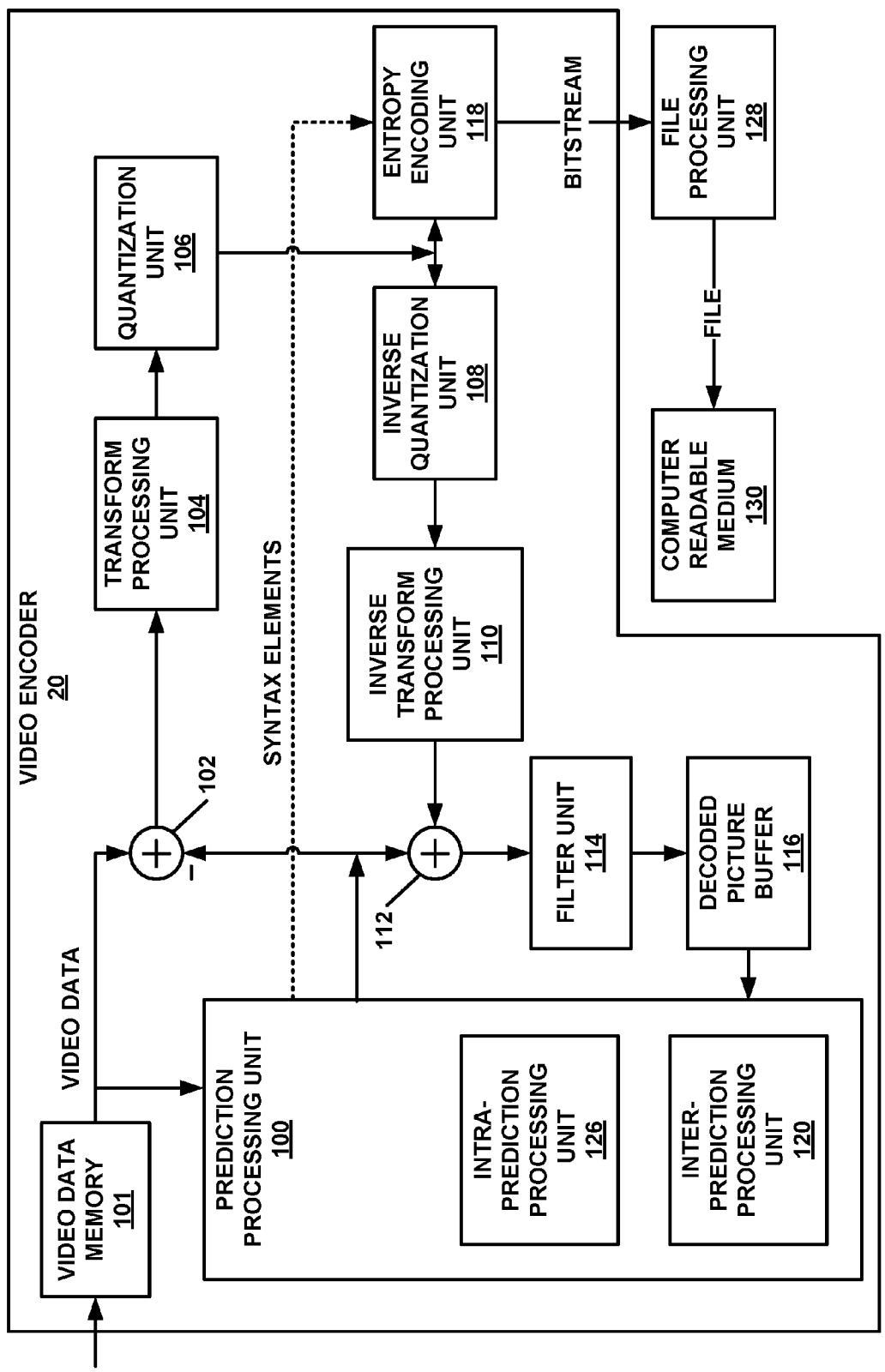
FIG. 5 is a block diagram illustrating an example video encoder.

FIG. 5 is a block diagram illustrating an example video encoder 20. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Inter-prediction processing unit 120 may generate predictive data for a PU by performing inter prediction on each PU of a CU. The predictive data for the PU may include predictive blocks of the PU and motion information for the PU. Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks. Residual generation unit 102 may generate, based on the coding blocks for a CU and the selected predictive blocks for the PUs of the CU, residual blocks for the CU.

Transform processing unit 104 may perform quad-tree partitioning to partition the residual blocks associated with a CU into transform blocks associated with TUs of the CU. A TU may be associated with a luma transform block and two chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Furthermore, in the example of FIG. 5, a file processing unit 128 may obtain the bitstream generated by video encoder 20. File processing unit 128 may be implemented by one or more processors of a device, such as source device 12, file generation device 34, a content delivery network device, or another type of device. File processing unit 128 may generate a file that stores the bitstream generated by video encoder 20. Computer readable medium 130 may receive the file generated by file processing unit 128. In some examples, computer readable medium 130 comprises a computer readable storage medium such as a memory, optical disc, magnetic disk, or other type of non-transitory storage medium from which a computing device is able to read data. In some examples where computer readable medium 130 comprises a computer readable storage medium, the computer readable storage medium may form part of a device, such as source device 12, file generation device 34, a content delivery network device, or another type of device. In some examples, computer readable medium 130 comprises a computer-readable communication medium, such as an optical fiber, communication cable, electro-magnetic wave, or other types of media from which a computing device is able to read data.

In accordance with a technique of this disclosure, file processing unit 128 may generate an operation point reference track in the file. As part of generating the operation point reference track, file processing unit 128 may signal, in the operation point reference track, an operation point information sample group that describes an operation point available for a bitstream in the file. Additionally, as part of generating the file, file processing unit 128 may generate one or more additional tracks in the file. In this example, no operation point information sample group is signaled in any of the additional tracks. Furthermore, based on the operation point reference track containing a sample that is temporally collocated with the respective sample in the respective additional track, file processing unit 128 may consider the respective sample in the respective additional track part of the operation point information sample group. Moreover, based on the operation point reference track not containing a sample that is temporally collocated with the respective sample in the respective additional track, file processing unit 128 may consider the respective sample in the respective additional track part of an operation point information sample group of the last sample in the operation point reference track before the respective sample of the respective additional track.

Figure 6:
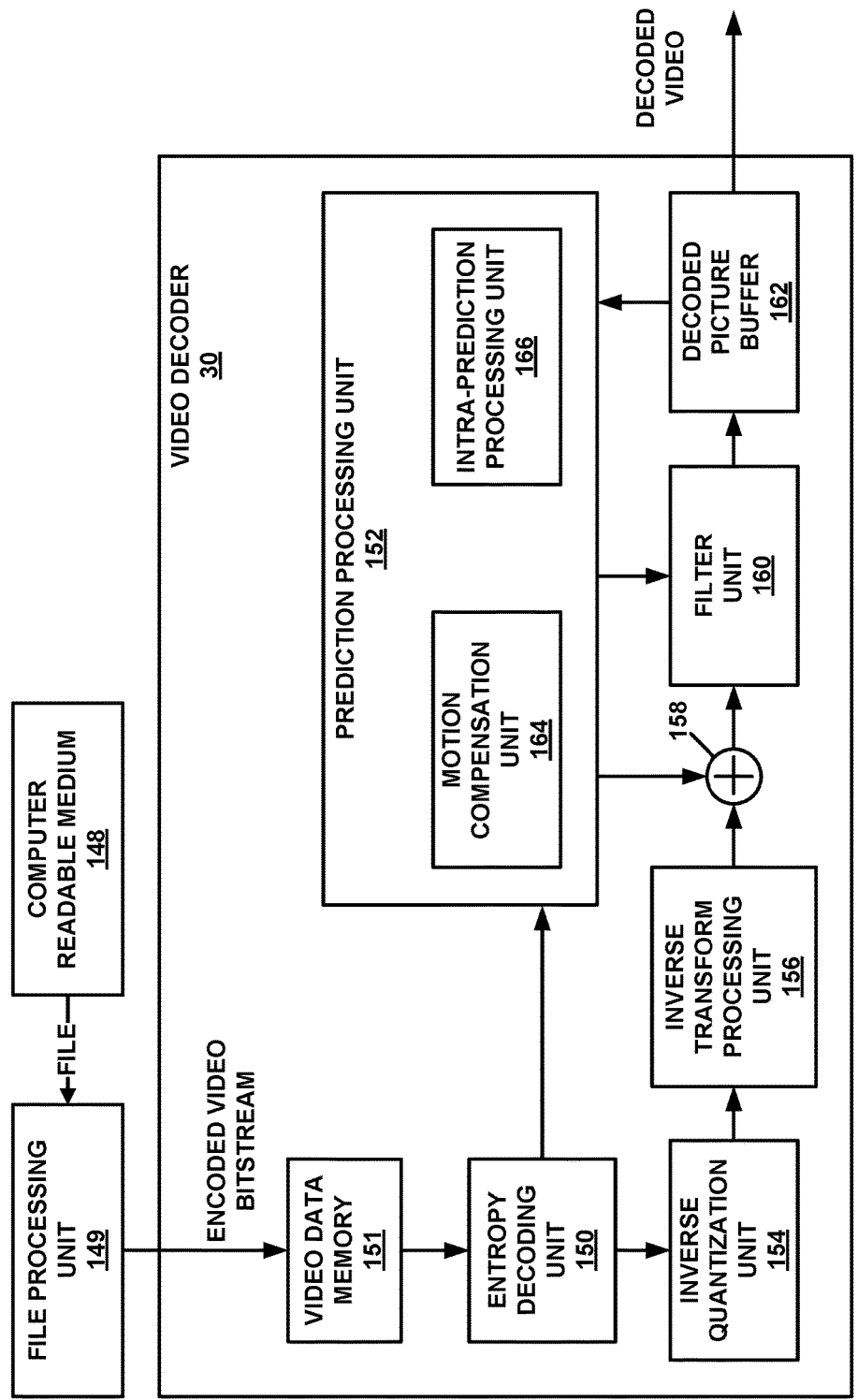
FIG. 6 is a block diagram illustrating an example video decoder.

FIG. 6 is a block diagram illustrating an example video decoder 30. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

Video data memory 151 receives and stores encoded video data (e.g., NAL units) of a bitstream. Entropy decoding unit 150 may receive encoded video data (e.g., NAL units) from the CPB and parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

In the example of FIG. 6, a computer readable medium 148 comprises a computer readable storage medium such as a memory, optical disc, magnetic disk, or other type of non-transitory storage medium from which a computing device is able to read data. In some examples where computer readable medium 148 comprises a computer readable storage medium, the computer readable storage medium may form part of a device, such as source device 12, file generation device 34, a content delivery network device, or another type of device. In some examples, computer readable medium 148 comprises a computer-readable communication medium, such as an optical fiber, communication cable, electro-magnetic wave, or other types of media from which a computing device is able to read data.

Furthermore, in the example of FIG. 6, a file processing unit 149 receives a file or portions of a file from computer readable medium 148. File processing unit 149 may be implemented by one or more processors of a device, such as destination device 14, a MANE, a content delivery network device, or another type of device.

File processing unit 149 may process the file. For instance, file processing unit 149 may obtain NAL units from the file. In the example of FIG. 6, the encoded video bitstream received by video decoder 30 may comprise NAL units obtained from the file.

In accordance with a technique of this disclosure, file processing unit 149 may obtain an operation point reference track in the file. An operation point available for a bitstream in the file is described in the file using an operation point information sample group that is signaled in the operation point reference track. Furthermore, file processing unit 149 may obtain one or more additional tracks in the file. No operation point information sample group is signaled in any of the additional tracks. Furthermore, for each respective sample of each respective additional track of the one or more additional tracks, file processing unit 149 may determine whether to consider the respective sample part of the operation point information sample group. Based on the operation point reference track containing a sample that is temporally collocated with the respective sample in the respective additional track, file processing unit 149 may consider the respective sample in the respective additional track part of the operation point information sample group. Based on the operation point reference track not containing a sample that is temporally collocated with the respective sample in the respective additional track, file processing unit 149 may consider the respective sample in the respective additional track part of an operation point information sample group of the last sample in the operation point reference track before the respective sample of the respective additional track. Furthermore, file processing unit 149 may perform a sub-bitstream extraction process that extracts the operation point from the bitstream.

Figure 7:
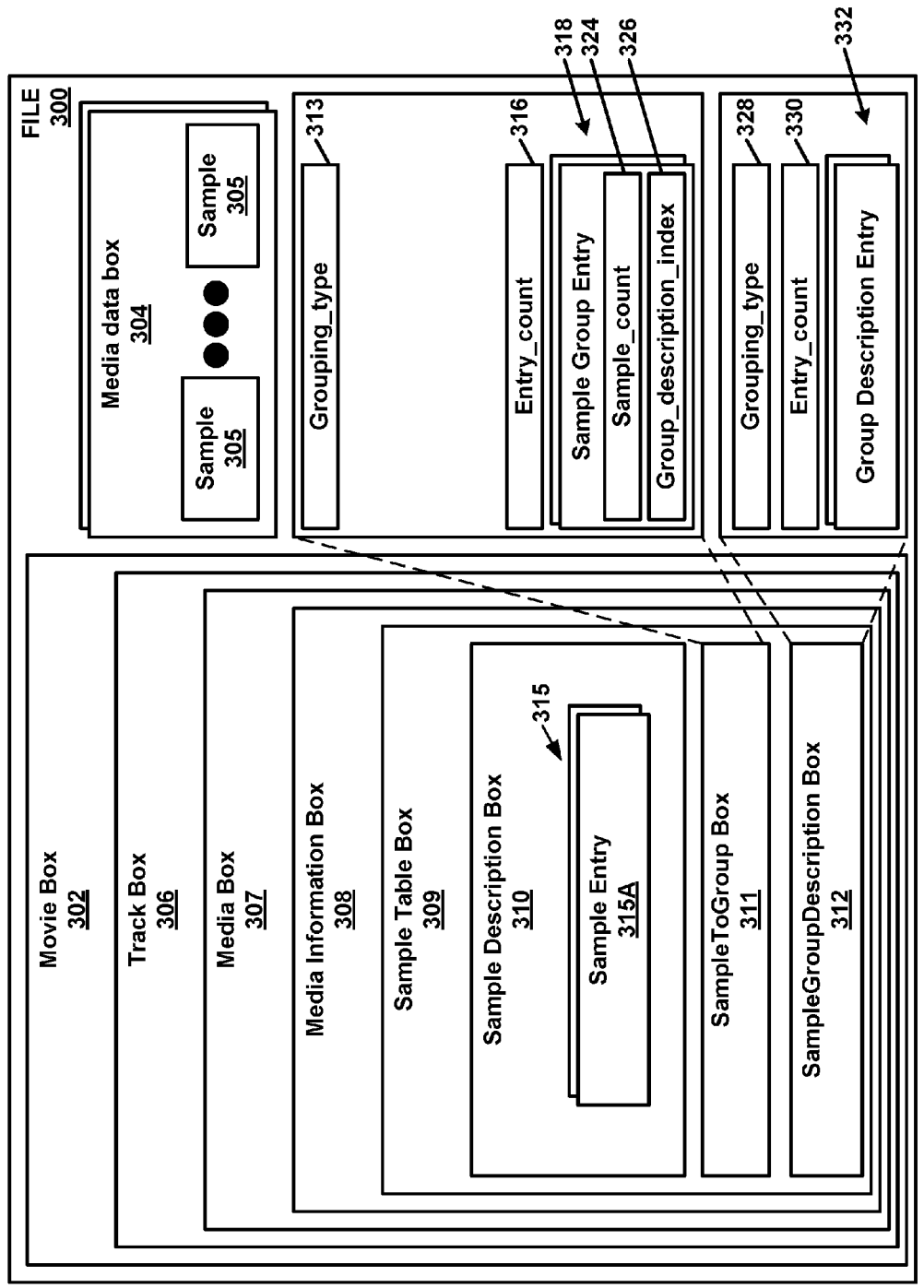
FIG. 7 is a block diagram illustrating example structures of a file, in accordance with one or more techniques of this disclosure.

FIG. 7 is a block diagram illustrating example structures of a file 300, in accordance with one or more techniques of this disclosure. File 300 may be generated and processed by various devices, such as source device 12 (FIG. 1), file generation device 34 (FIG. 1), destination device 14 (FIG. 1), file processing unit 128 (FIG. 5), a MANE, a content delivery network device, or other types of devices or units. In the example of FIG. 7, file 300 includes a Movie box 302 and a plurality of Media Data boxes 304. Although illustrated in the example of FIG. 7 as being in the same file, in other examples Movie box 302 and Media Data boxes 304 may be in separate files. As indicated above, a box may be an object-oriented building block defined by a unique type identifier and length. For instance, a box may be the elementary syntax structure in ISOBMFF, including a four-character coded box type, a byte count of the box, and a payload.

Movie box 302 may contain metadata for tracks of file 300. Each track of file 300 may comprise a continuous stream of media data. Each of Media Data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 7, Movie box 302 includes a Track box 306. Track box 306 may enclose metadata for a track of file 300. In other examples, Movie box 302 may include multiple Track boxes for different tracks of file 300. Track box 306 includes a Media box 307. Media box 307 may contain all objects that declare information about the media data within the track. Media box 307 includes a Media Information box 308. Media Information box 308 may contain all objects that declare characteristic information of the media of the track. Media Information box 308 includes a Sample Table box 309. Sample Table box 309 may specify sample-specific metadata. Sample Table box 309 may include zero or more SampleToGroup boxes and zero or more SampleGroupDescription boxes.

In the example of FIG. 7, Sample Table box 309 may include a Sample Description box 310. Additionally, Sample Table box 309 may include zero or more SampleToGroup boxes and zero or more SampleGroupDescription boxes. Particularly, in the example of FIG. 7, Sample Table box 309 includes a SampleToGroup box 311 and a SampleGroupDescription box 312. In other examples, Sample Table box 309 may include other boxes in addition to Sample Description box 310, SampleToGroup box 311, and SampleGroup-Description box 312, and/or may include multiple SampleToGroup boxes and SampleGroupDescription boxes. SampleToGroup box 311 may map samples (e.g., particular ones of samples 305) to a group of samples. SampleGroupDescription box 312 may specify a property shared by the samples in the group of samples (i.e., sample group). Sample Description Box 310 comprises a set of sample entries 315 for the track. A sample (e.g., one of samples 305) may include a syntax element that indicates one of sample entries 315 as being applicable to the sample.

Furthermore, in the example of FIG. 7, SampleToGroup box 311 includes a grouping_type syntax element 313 (i.e., a grouping type syntax element), an entry_count syntax element 316 (i.e., an entry count syntax element), and one or more sample group entries 318. Grouping_type syntax element 313 is an integer that identifies the type (i.e. criterion used to form the sample groups) of the sample grouping and links it to its sample group description table with the same value for grouping type. In some examples, at most one occurrence of SampleToGroup box 311 with the same value for grouping_type syntax element 313 shall exist for a track.

Entry_count syntax element 316 indicates the number of sample group entries 318. Each of sample group entries 318 includes a sample_count syntax element 324 (i.e., a sample count syntax element) and a group_description_index syntax element 326 (i.e., a group description index syntax element). Sample_count syntax element 324 may indicate a number of samples associated with the sample group entry containing sample_count syntax element 324. Group_description index syntax element 326 may identify, within a SampleGroupDescription box (e.g., SampleGroupDescription box 312), a group description entry that contains a description of the samples associated with the sample group entry containing group_description_index syntax element 326. Group_description_index syntax element 326 may range from 1 to the number of sample group entries in SampleGroupDescription box 312. Group_description_index syntax element 326 having the value 0 indicates that the sample is a member of no group of the type indicated by grouping_type syntax element 313.

Additionally, in the example of FIG. 7, SampleGroupDescription box 312 includes a grouping_type syntax element 328, an entry_count syntax element 330, and one or more group description entries 332. Grouping_type syntax element 328 is an integer that identifies a SampleToGroup box (e.g., SampleToGroup box 311) that is associated with SampleGroupDescription box 312. Entry_count syntax element 330 indicates the number of group description entries 332 in the SampleGroupDescription box. Each of group description entries 332 may include a description of a sample group. For example, group description entries 332 may include a sample group description entry for an 'oinf' sample group.

In accordance with the first technique of this disclosure, based on an operation point reference track of file 300 containing a sample that is temporally collocated with a respective sample in an additional track of file 300, a device interpreting file 300 may consider the respective sample in the respective additional track to be part of an operation point information sample group described by a sample group description entry among group description entries 332 in SampleGroupDescription Box 312. Moreover, based on the operation point reference track not containing a sample that is temporally collocated with the respective sample in the respective additional track, the device may consider the respective sample in the respective additional track part of an operation point information sample group of the last sample in the operation point reference track before the respective sample of the respective additional track.

Figure 8:
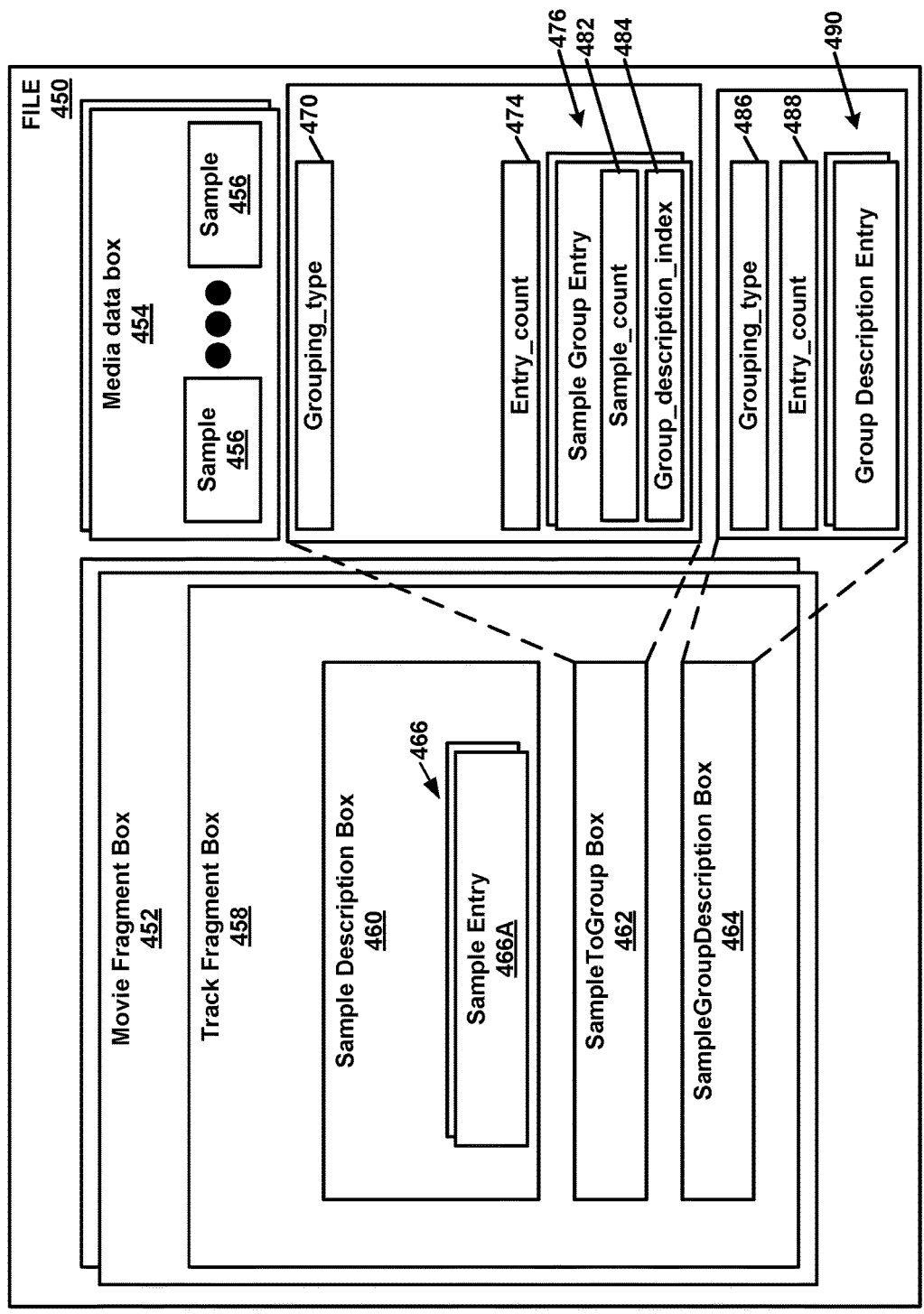
FIG. 8 is a conceptual diagram illustrating example structures of a file, in accordance with one or more techniques of this disclosure.

FIG. 8 is a conceptual diagram illustrating example structures of a file 450, in accordance with one or more techniques of this disclosure. File 450 may be generated and processed by various devices, such as source device 12 (FIG. 1), file generation device 34 (FIG. 1), destination device 14 (FIG. 1), file processing unit 149 (FIG. 6), a MANE, a content delivery network device, or other types of devices or units. In the example of FIG. 8, file 450 includes one or more Movie Fragment boxes 452 and a plurality of media data boxes 454. Although illustrated in the example of FIG. 8 as being in the same file, in other examples Movie Fragment boxes 452 and Media Data boxes 454 may be in separate files. Each of Media Data boxes 454 may include one or more samples 456. Each of the Movie Fragment boxes corresponds to a movie fragment. Each movie fragment may comprise a set of track fragments. There may be zero or more track fragments per track.

In the example of FIG. 8, a Movie Fragment box 452 provides information regarding a corresponding movie fragment. Such information would have previously been in a Movie box, such as Movie box 302. Movie Fragment box 452 may include a Track Fragment box 458. Track Fragment box 458 corresponds to a track fragment and provides information about the track fragment.

For instance, in the example of FIG. 8, Track Fragment box 458 may include one or more SampleToGroup boxes 462 and one or more SampleGroupDescription boxes 464 that contain information about the track fragment corresponding to Track Fragment box 458.

Furthermore, in the example of FIG. 8, Track Fragment box 458 may include a Sample Description box 460, zero or more SampleToGroup boxes, and zero or more SampleGroupDescription boxes. In the example of FIG. 8, Track Fragment box 458 contains a SampleToGroup box 462 and a SampleGroupDescription box 464 that contain information about the track fragment corresponding to Track Fragment box 458.

Sample Description Box 460 comprises a set of sample entries 466 for the track fragment. Each respective sample entry of sample entries 466 applies to one or more samples of the track. In the example of FIG. 8, the set of sample entries 466 includes a sample entry 466A.

SampleToGroup box 462 includes a grouping_type syntax element 470 (i.e., a grouping type syntax element), an entry_count syntax element 474 (i.e., an entry count syntax element), and one or more sample group entries 476. Each of sample group entries 476 includes a sample_count syntax element 482 (i.e., a sample count syntax element) and a group_description_index syntax element 484 (i.e., a group description index syntax element). Grouping_type syntax element 470, entry_count syntax element 474, sample_count syntax element 482, and group_description_index 484 may have the same semantics as corresponding syntax elements described with respect to the example of FIG. 7.

Additionally, in the example of FIG. 8, SampleGroupDescription box 464 includes a grouping_type syntax element 486, an entry_count syntax element 488, and one or more group description entries 490. Grouping_type syntax element 486, entry_count syntax element 488, and group description entries 490 may have the same semantics as corresponding syntax elements and structures described with respect to the example of FIG. 7. For example, group description entries 332 may include a sample group description entry for an 'oinf' sample group.

In accordance with the first technique of this disclosure, based on an operation point reference track of file 450 containing a sample that is temporally collocated with a respective sample in an additional track of file 450, a device interpreting file 450 may consider the respective sample in the respective additional track to be part of an operation point information sample group described by a sample group description entry among group description entries 490 in SampleGroupDescription box 464. Moreover, based on the operation point reference track not containing a sample that is temporally collocated with the respective sample in the respective additional track, the device may consider the respective sample in the respective additional track part of an operation point information sample group of the last sample in the operation point reference track before the respective sample of the respective additional track.

Figure 9:
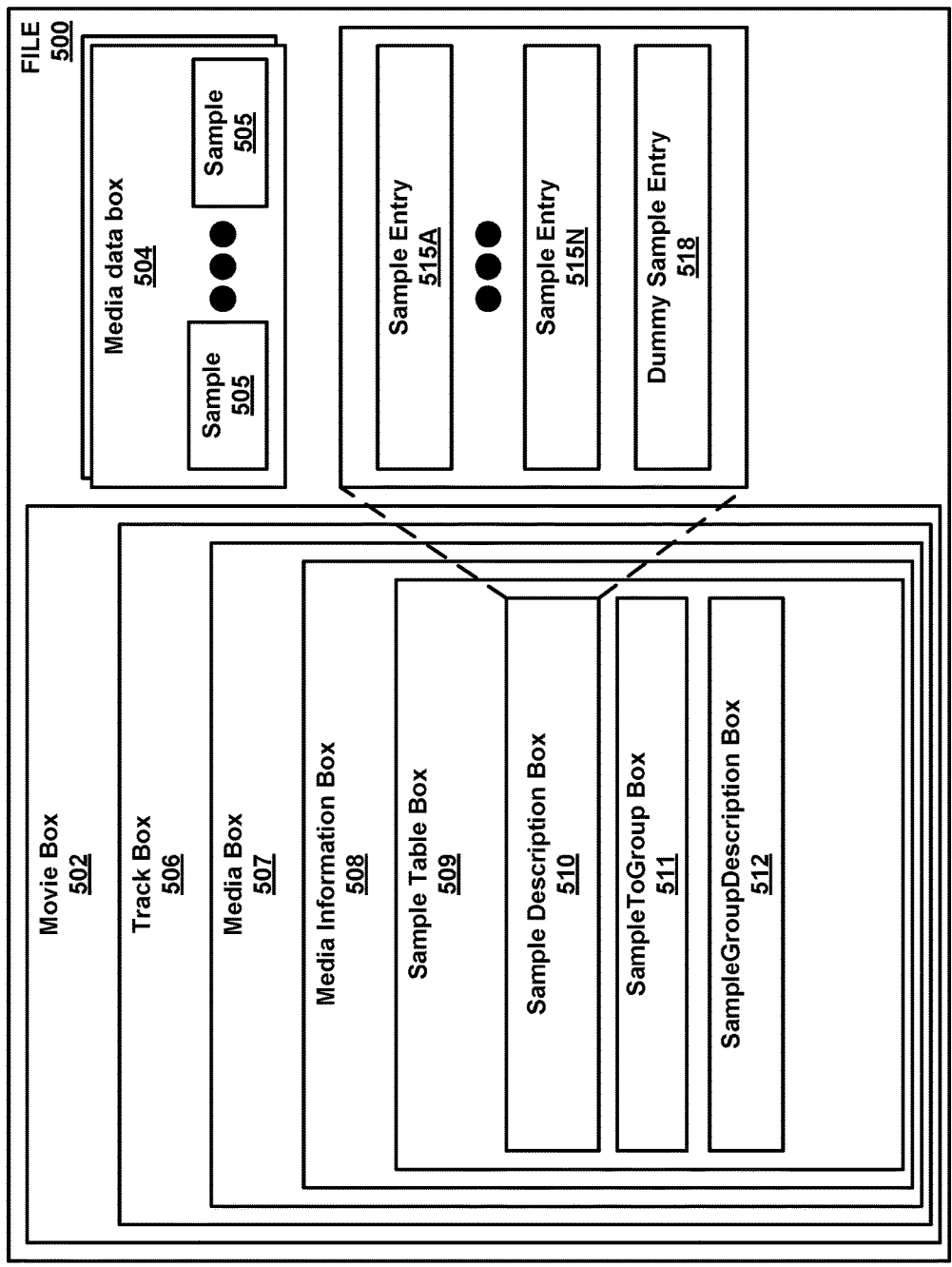
FIG. 9 is a block diagram illustrating example structures of a file, including a dummy sample entry, in accordance with one or more techniques of this disclosure.

FIG. 9 is a block diagram illustrating example structures of a file 500, including a dummy sample entry, in accordance with one or more techniques of this disclosure. File 500 may be generated and processed by various devices, such as source device 12 (FIG. 1), file generation device 34 (FIG. 1), destination device 14 (FIG. 1), file processing unit 128 (FIG. 5), a MANE, a content delivery network device, or other types of devices or units. In the example of FIG. 9, file 500 may include a movie box 502, a media data box 504 containing samples 505, a track box 506, a media box 507, a media information box 508, and a sample table box 509 containing a sample description box 510, a SampleToGroup box 511 and a SampleGroupDescription box 512. Furthermore, in the example of FIG. 9, sample description box 510 may include sample entries 515A through 515N (collectively, "sample entries 515"). These boxes may have similar structures and semantics to the corresponding boxes described above with regard to the example of FIG. 7. However, in accordance with the fourth example technique of this disclosure, sample description box 510 may include a dummy sample entry 518. Dummy sample entry 518 is not applicable to any samples of the track corresponding to track box 506, but may contain parameter sets that are used only by other tracks containing layers that depend on the layers in the track corresponding to track box 506. For instance, dummy sample entry 518 may include information describing operation points. An example similar to that provided in FIG. 8 may occur where sample description box 460 includes a dummy sample entry.

Figure 10:
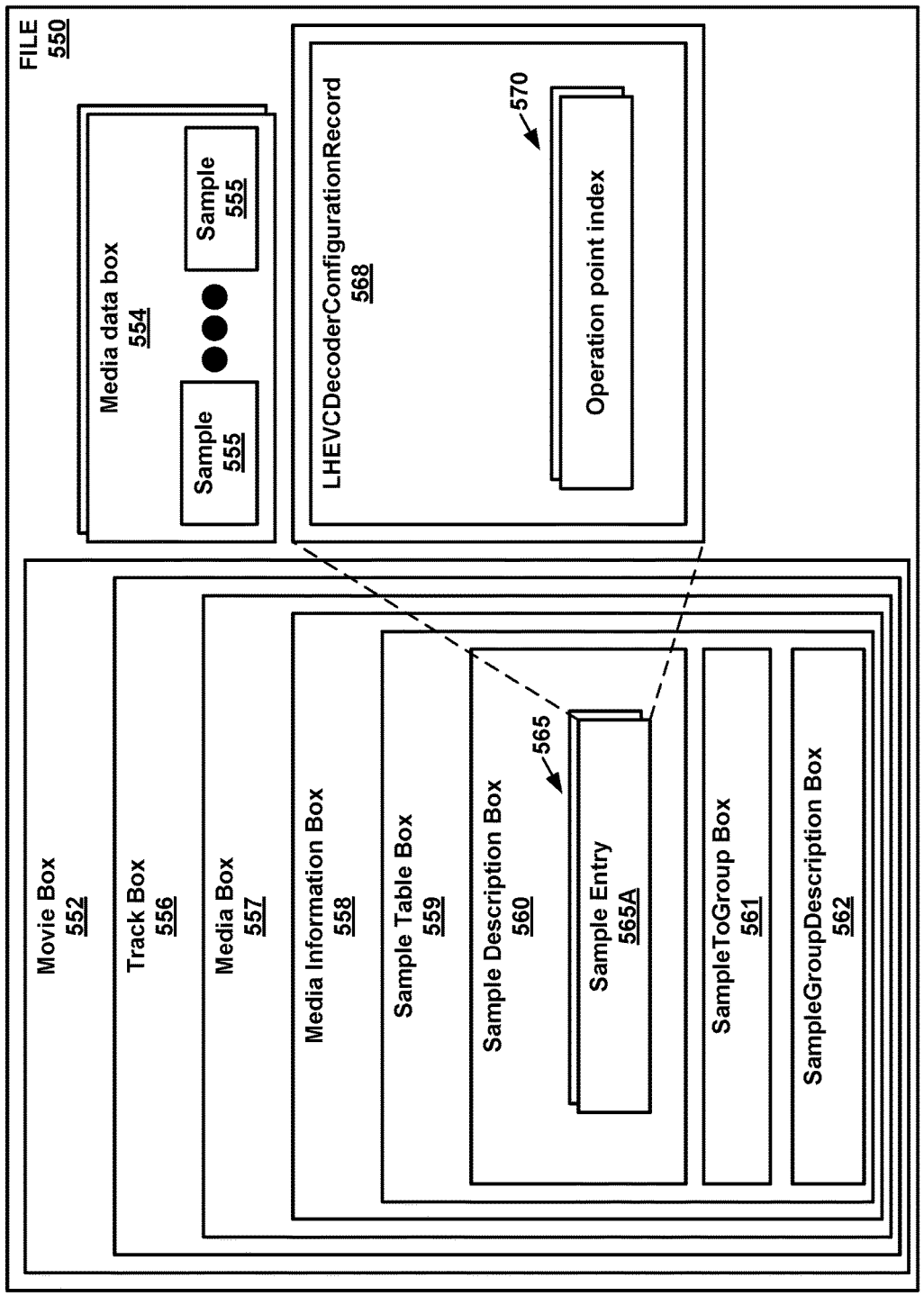
FIG. 10 is a block diagram illustrating example structures of a file in which sample entries include operation point indexes, in accordance with one or more techniques of this disclosure.

FIG. 10 is a block diagram illustrating example structures of a file 550 in which sample entries include operation point indexes, in accordance with one or more techniques of this disclosure. File 550 may be generated and processed by various devices, such as source device 12 (FIG. 1), file generation device 34 (FIG. 1), destination device 14 (FIG. 1), file processing unit 128 (FIG. 5), a MANE, a content delivery network device, or other types of devices or units. In the example of FIG. 10, file 550 may include a movie box 552, a media data box 554 containing samples 555, a track box 556, a media box 557, a media information box 558, and a sample table box 559 containing a sample description box 560, a SampleToGroup box 561 and a SampleGroupDescription box 562. Furthermore, in the example of FIG. 10, sample description box 560 may include sample entries 555A through 555N (collectively, "sample entries 555"). These boxes may have similar structures and semantics to the corresponding boxes described above with regard to the example of FIG. 7.

Furthermore, in some examples, sample entries 565 may include instances of a LHEVCDecoderConfigurationRecord class. For instance, in the example of FIG. 10, sample entry 565A may include a LHEVCDecoderConfigurationRecord 568. In accordance with the fifth example technique of this disclosure described above, LHEVCDecoderConfigurationRecord 568 may include one or more operation point index syntax elements 570 (e.g., op_idx). Each respective operation point index syntax element gives an index into a list of operation points signaled in an 'oinf' box. Thus, a device may be able to determine, based on the sample entry of a sample, operation points of encoded pictures contained by the sample. An example similar to that provided in FIG. 8 may occur where sample entries 446 include operation point indices.

Figure 11:
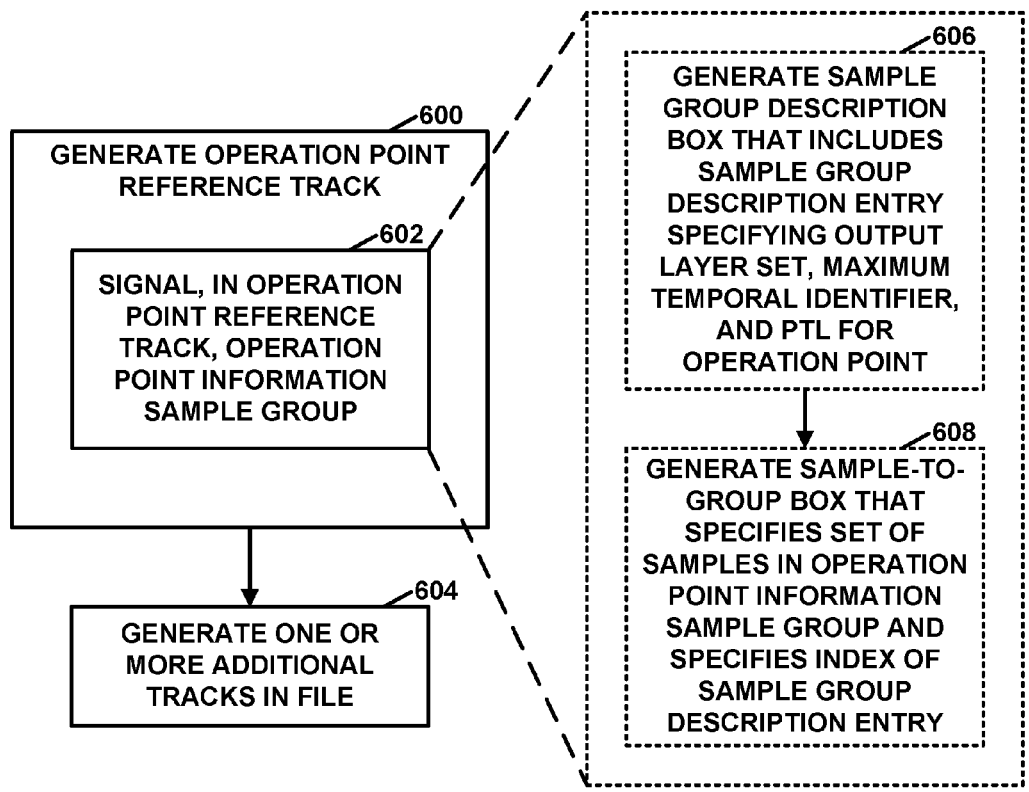
FIG. 11 is a flowchart illustrating an example operation of a device for processing a file, in accordance with a technique of this disclosure.

FIG. 11 is a flowchart illustrating an example operation of a device for processing a file, in accordance with a technique of this disclosure. The flowcharts of this disclosure are provided as examples. In other examples, different actions may be performed or actions may be performed in different orders, or in parallel. The example of FIG. 11 may be performed by various types of devices, such as source device 12 (FIG. 1), file generation device 34 (FIG. 1), file processing unit 128 (FIG. 5), a file server, a streaming device, a MANE, or another type of device or unit.

In the example of FIG. 11, the device generates an operation point reference track in the file (600). Generating a track may comprise generating a track box that includes data indicating samples that belong to the track. As part generating the operation point reference track, the device may signal, in the operation point reference track, an operation point information sample group that describes an operation point available for a bitstream in the file (602). In some examples, the device may encode video data to generate the bitstream. Additionally, in the example of FIG. 11, the device may generate one or more additional tracks in the file (604). In the example of FIG. 11, no operation point information sample group is signaled in any of the additional tracks. Furthermore, based on the operation point reference track containing a sample that is temporally collocated with the respective sample in the respective additional track, the respective sample in the respective additional track is considered part of the operation point information sample group. Based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

Furthermore, as shown in the example of FIG. 11, in some examples, as part of signaling the operation point information sample group, the device may generate, in the file, a sample group description box (606), such as SampleGroupDescription box 312 or SampleGroupDescription box 464. The sample group description box includes a sample group description entry (e.g., one of group description entries 332 or 490) specifying an output layer set for the operation point, a maximum temporal identifier for the operation point, and profile, level, and tier signaling for the operation point. Furthermore, the device may generate, in the file, a sample-to-group box (e.g., SampleToGroup box 311, 462) that specifies a set of samples in the operation point information sample group and specifies an index of the sample group description entry in the sample group description box (608).

Figure 12:
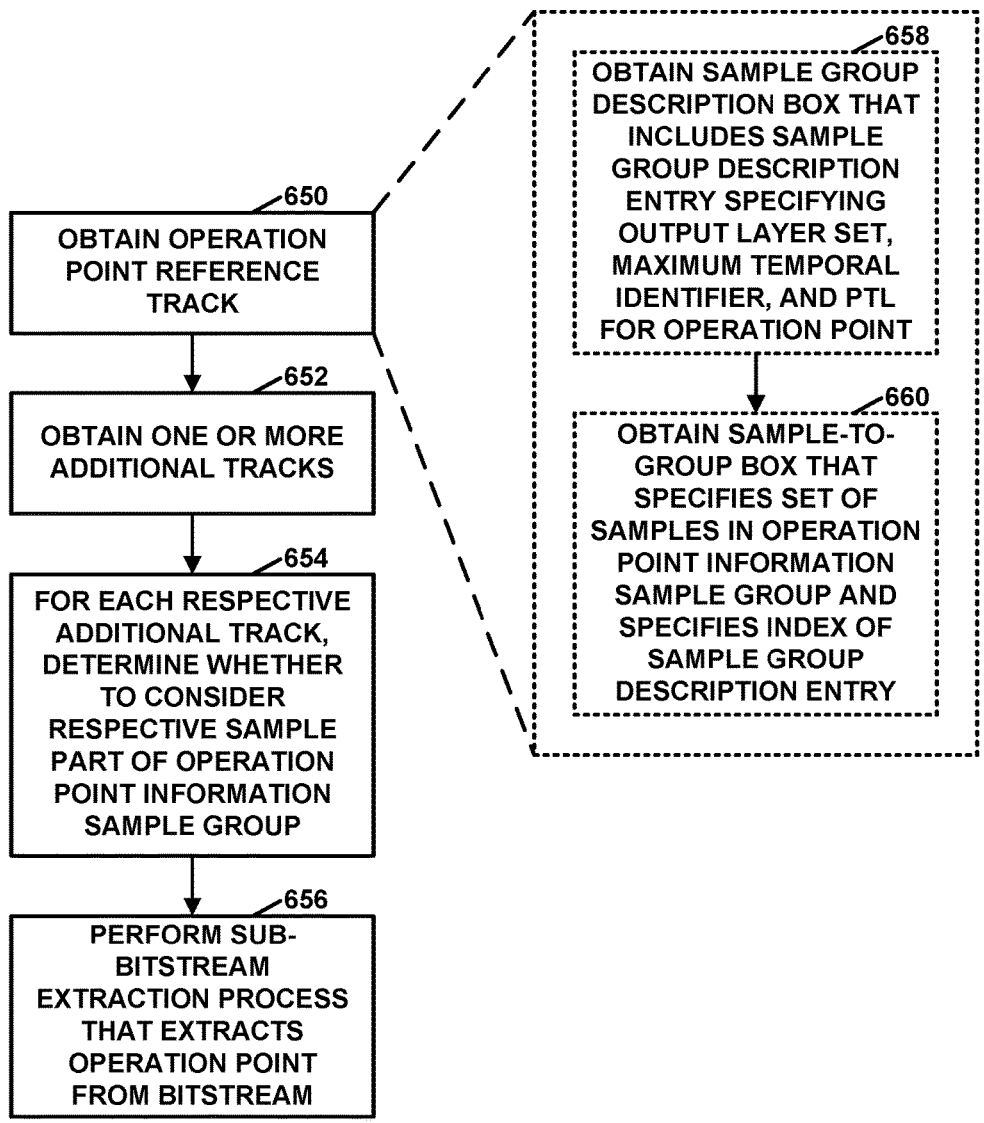
FIG. 12 is a flowchart illustrating an example operation of a device for processing a file, in accordance with a technique of this disclosure.

FIG. 12 is a flowchart illustrating an example operation of a device for processing a file, in accordance with a technique of this disclosure. The example of FIG. 12 may be performed by various types of devices, such as destination device 14, a file generation device, a file server, a streaming device, a MANE, or another type of device.

In the example of FIG. 12, the device may obtain an operation point reference track in the file (650). An operation point available for a bitstream in the file is described in the file using an operation point information sample group that is signaled in the operation point reference track. Furthermore, in the example of FIG. 12, the device may obtain one or more additional tracks in the file (652). No operation point information sample group is signaled in any of the additional tracks.

For each respective sample of each respective additional track of the one or more additional tracks, the device may determine whether to consider the respective sample part of the operation point information sample group (654). Based on the operation point reference track containing a sample that is temporally collocated with the respective sample in the respective additional track, the respective sample in the respective additional track is considered part of the operation point information sample group. Based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

Furthermore, in the example of FIG. 12, the device may perform a sub-bitstream extraction process that extracts the operation point from the bitstream (656). In some examples, the device may transmit samples containing encoded pictures of the extracted operation point without transmitting samples of the bitstream not containing encoded pictures of the extracted operation point. In some examples, the device may generate a new file that stores samples containing encoded pictures of the extracted operation point without storing in the file sample containing encoded pictures of the extracted operation point. In some examples, the device may decode video data of the operation point. For instance, the device may decode encoded pictures of the operation point using a video codec, such as L-HEVC.

Furthermore, as illustrated in the example of FIG. 12, in some examples, as part of obtaining the operation point reference track, the device may obtain, from the file, a sample group description box (658), such as SampleGroupDescription box 312 or SampleGroupDescription box 464. The sample group description box includes a sample group description entry (e.g., one of group description entries 332 or 490) specifying an output layer set for the operation point, a maximum temporal identifier for the operation point, and profile, level, and tier signaling for the operation point. Additionally, the device may obtain, from the file, a sample-to-group box (e.g., SampleToGroup box 311, 462) that specifies a set of samples in the operation point information sample group and specifies an index of the sample group description entry in the sample group description box (660).

It should be understood that all of the techniques described herein may be used individually or in combination. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder. Processing circuits may be coupled to a data storage medium in various ways. For example, a processing circuit may be coupled to a data storage medium via an internal device interconnect, a wired or wireless network connection, or another communication medium.

Certain aspects of this disclosure have been described with respect to the HEVC standard for purposes of illustration. However, the techniques described in this disclosure may be useful for other video coding processes, including other standard or proprietary video coding processes not yet developed.

Video encoder 20 (FIGS. 1 and 5) and/or video decoder 30 (FIGS. 1 and 6) may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a file, the method comprising:
    obtaining an operation point reference track in the file, wherein an operation point available for a bitstream in the file is described in the file using an operation point information sample group that is signaled in the operation point reference track;
    obtaining one or more additional tracks in the file, wherein no operation point information sample group is signaled in any of the additional tracks;
    for each respective sample of each respective additional track of the one or more additional tracks, determining whether to consider the respective sample part of the operation point information sample group, wherein:
        based on the operation point reference track containing a sample that is temporally collocated with the respective sample in the respective additional track, the respective sample in the respective additional track is considered part of the operation point information sample group, and
        based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and
    performing a sub-bitstream extraction process that extracts the operation point from the bitstream.

2. The method of claim 1, wherein obtaining the operation point reference
    track comprises:
    obtaining, from the file, a sample group description box, wherein the sample group description box includes a sample group description entry specifying an output layer set for the operation point, a maximum temporal identifier for the operation point, and profile, level, and tier signaling for the operation point; and
    obtaining, from the file, a sample-to-group box that specifies a set of samples in the operation point information sample group and specifies an index of the sample group description entry in the sample group description box.

3. The method of claim 1, wherein:
    the operation point information sample group is a first operation point information sample group,
    the first operation point information sample group comprises a first set of samples in the operation point reference track,
    the operation point reference track contains a second operation point sample group that comprises a second set of samples in the operation point reference track,
    there is no sample in the operation point reference track occurring at a decoding time between a decoding time of a sample having a latest decoding time among the first set of samples and a sample having an earliest decoding time among the second set of samples, and
    there are one or more samples in a particular additional track of the one or more additional tracks that have decoding times between the decoding time of the sample having the latest decoding time among the first set of samples and the sample having the earliest decoding time among the second set of samples.

4. The method of claim 3, wherein the particular additional track has a higher frame rate than the operation point reference track.

5. The method of claim 1, wherein:
    the bitstream includes a base layer and one or more enhancement layers,
    the operation point reference track contains the base layer, and
    each respective track of the one or more additional tracks contains a respective enhancement layer of the one or more enhancement layers.

6. The method of claim 1, further comprising at least one of:
    after extracting the operation point, decoding video data of the operation point, or
    transmitting samples of the file containing encoded pictures of the operation point without transmitting samples of the file not containing encoded pictures of the operation point.

7. The method of claim 1, wherein each respective sample of the operation point reference track and each respective sample of the additional tracks comprises a respective access unit that comprises one or more encoded pictures corresponding to the same time instance.

8. A method of generating a file, the method comprising:
    generating an operation point reference track in the file, wherein generating the operation point reference track comprises signaling, in the operation point reference track, an operation point information sample group that describes an operation point available for a bitstream in the file; and
    generating one or more additional tracks in the file, wherein:
        no operation point information sample group is signaled in any of the additional tracks, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

9. The method of claim 8, wherein generating the operation point reference track comprises:

generating, in the file, a sample group description box, wherein the sample group description box includes a sample group description entry specifying an output layer set for the operation point, a maximum temporal identifier for the operation point, and profile, level, and tier signaling for the operation point; and generating, in the file, a sample-to-group box that specifies a set of samples in the operation point information sample group and specifies an index of the sample group description entry in the sample group description box.

10. The method of claim 8, wherein:

the operation point information sample group is a first operation point information sample group, the first operation point information sample group comprises a first set of samples in the operation point reference track, the operation point reference track contains a second operation point sample group that comprises a second set of samples in the operation point reference track, there is no sample in the operation point reference track occurring at a decoding time between a decoding time of a sample having a latest decoding time among the first set of samples and a sample having an earliest decoding time among the second set of samples, and there are one or more samples in a particular additional track of the one or more additional tracks that have decoding times between the decoding time of the sample having the latest decoding time among the first set of samples and the sample having the earliest decoding time among the second set of samples.

11. The method of claim 10, wherein the particular additional track has a higher frame rate than the operation point reference track.

12. The method of claim 8, wherein:

the bitstream includes a base layer and one or more enhancement layers, the operation point reference track contains the base layer, and each respective track of the one or more additional tracks contains a respective enhancement layer of the one or more enhancement layers.

13. The method of claim 8, further comprising: encoding video data to generate the bitstream.

14. The method of claim 8, wherein each respective sample of the operation point reference track and each respective sample of the additional tracks comprises a respective access unit that comprises one or more encoded pictures corresponding to the same time instance.

15. An apparatus for processing a file, the apparatus comprising:

a memory configured to store the file; and one or more processors coupled to the memory, the one or more processors configured to:

obtain an operation point reference track in the file, wherein an operation point available for a bitstream in the file is described in the file using an operation point information sample group that is signaled in the operation point reference track;

obtain one or more additional tracks in the file, wherein no operation point information sample group is signaled in any of the additional tracks;

for each respective sample of each respective additional track of the one or more additional tracks, determine whether to consider the respective sample part of the operation point information sample group, wherein:

based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and perform a sub-bitstream extraction process that extracts the operation point from the bitstream.

16. The apparatus of claim 15, wherein the one or more processors are configured such that, as part of obtaining the operation point reference track, the one or more processors:

obtain, from the file, a sample group description box, wherein the sample group description box includes a sample group description entry specifying an output layer set for the operation point, a maximum temporal identifier for the operation point, and profile, level, and tier signaling for the operation point; and obtain, from the file, a sample-to-group box that specifies a set of samples in the operation point information sample group and specifies an index of the sample group description entry in the sample group description box.

17. The apparatus of claim 15, wherein:

the operation point information sample group is a first operation point information sample group, the first operation point information sample group comprises a first set of samples in the operation point reference track, the operation point reference track contains a second operation point sample group that comprises a second set of samples in the operation point reference track, there is no sample in the operation point reference track occurring at a decoding time between a decoding time of a sample having a latest decoding time among the first set of samples and a sample having an earliest decoding time among the second set of samples, and there are one or more samples in a particular additional track of the one or more additional tracks that have decoding times between the decoding time of the sample having the latest decoding time among the first set of samples and the sample having the earliest decoding time among the second set of samples.

18. The apparatus of claim 17, wherein the particular additional track has a higher frame rate than the operation point reference track.

19. The apparatus of claim 15, wherein:
the bitstream includes a base layer and one or more enhancement layers,
the operation point reference track contains the base layer, and
each respective track of the one or more additional tracks contains a respective enhancement layer of the one or more enhancement layers.

20. The apparatus of claim 15, wherein the one or more processors are further configured to perform at least one of:
after extracting the operation point, decode video data of the operation point, or
forward the operation point without forwarding non-extracted operation points of the bitstream.

21. The apparatus of claim 15, wherein each respective sample of the operation point reference track and each respective sample of the additional tracks comprises a respective access unit that comprises one or more encoded pictures corresponding to the same time instance.

22. An apparatus for generating a file, the apparatus comprising:
a memory configured to store the file; and
one or more processors coupled to the memory, the one or more processors configured to:
generate an operation point reference track in the file, wherein the one or more processors are configured such that, as part of generating the operation point reference track, the one or more processors signal, in the operation point reference track, an operation point information sample group that describes an operation point available for a bitstream in the file; and
generate one or more additional tracks in the file, wherein:
no operation point information sample group is signaled in any of the additional tracks,
the operation point information sample group,
based on the operation point reference track containing a sample that is temporally collocated with the respective sample in the respective additional track, the respective sample in the respective additional track is considered part of the operation point information sample group, and
based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

23. The apparatus of claim 22, wherein the one or more processors are configured such that, as part of generating the operation point reference track, the one or more processors:
generate, in the file, a sample group description box, wherein the sample group description box includes a sample group description entry specifying an output layer set for the operation point, a maximum temporal identifier for the operation point, and profile, level, and tier signaling for the operation point; and
generate, in the file, a sample-to-group box that specifies a set of samples in the operation point information sample group and specifies an index of the sample group description entry in the sample group description box.

24. The apparatus of claim 22, wherein:
the operation point information sample group is a first operation point information sample group,
the first operation point information sample group comprises a first set of samples in the operation point reference track,
the operation point reference track contains a second operation point sample group that comprises a second set of samples in the operation point reference track,
there is no sample in the operation point reference track occurring at a decoding time between a decoding time of a sample having a latest decoding time among the first set of samples and a sample having an earliest decoding time among the second set of samples, and
there are one or more samples in a particular additional track of the one or more additional tracks that have decoding times between the decoding time of the sample having the latest decoding time among the first set of samples and the sample having the earliest decoding time among the second set of samples.

25. The apparatus of claim 24, wherein the particular additional track has a higher frame rate than the operation point reference track.

26. The apparatus of claim 22, wherein:
the bitstream includes a base layer and one or more enhancement layers,
the operation point reference track contains the base layer, and
each respective track of the one or more additional tracks contains a respective enhancement layer of the one or more enhancement layers.

27. The apparatus of claim 22, wherein the one or more processors are further configured to encode video data to generate the bitstream.

28. The apparatus of claim 22, wherein each respective sample of the operation point reference track and each respective sample of the additional tracks comprises a respective access unit that comprises one or more encoded pictures corresponding to the same time instance.

29. An apparatus for processing a file, the apparatus comprising:
means for obtaining an operation point reference track in the file, wherein an operation point available for a bitstream in the file is described in the file using an operation point information sample group that is signaled in the operation point reference track;
means for obtaining one or more additional tracks in the file, wherein no operation point information sample group is signaled in any of the additional tracks;
one or more processors configured to determine, for each respective sample of each respective additional track of the one or more additional tracks, whether to consider the respective sample part of the operation point information sample group, wherein:
based on the operation point reference track containing a sample that is temporally collocated with the respective sample in the respective additional track, the respective sample in the respective additional track is considered part of the operation point information sample group, and
based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and means for performing a sub-bitstream extraction process that extracts the operation point.

30. An apparatus for generating a file, the apparatus comprising:

means for generating an operation point reference track in the file, wherein the means for generating the operation point reference track comprises means for signaling, in the operation point reference track, an operation point information sample group that describes an operation point available for a bitstream in the file; and means for generating one or more additional tracks in the file, wherein:

no operation point information sample group is signaled in any of the additional tracks, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

31. A non-transitory computer-readable storage medium storing instructions that, when executed, cause one or more processors to:

obtain an operation point reference track in the file, wherein an operation point available for a bitstream in the file is described in the file using an operation point information sample group that is signaled in the operation point reference track;

obtain one or more additional tracks in the file, wherein no operation point information sample group is signaled in any of the additional tracks;

for each respective sample of each respective additional track of the one or more additional tracks, determine whether to consider the respective sample part of the operation point information sample group, wherein:

based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track; and perform a sub-bitstream extraction process that extracts the operation point from the bitstream.

32. A non-transitory computer-readable storage medium storing instructions that, when executed, cause one or more processors to:

generate an operation point reference track in the file, wherein generating the operation point reference track comprises signaling, in the operation point reference track, an operation point information sample group that describes an operation point available for a bitstream in the file; and generate one or more additional tracks in the file, wherein:

no operation point information sample group is signaled in any of the additional tracks, the operation point information sample group, based on the operation point reference track containing a sample that is temporally collocated with the respective sample in the respective additional track, the respective sample in the respective additional track is considered part of the operation point information sample group, and based on the operation point reference track not containing a sample that is temporally collocated with the respective sample in the respective additional track, the respective sample in the respective additional track is considered part of an operation point information sample group of the last sample in the operation point reference track before the respective sample of the respective additional track.

* * * * *